United States Patent
Ikai et al.

(10) Patent No.: US 6,870,801 B2
(45) Date of Patent: Mar. 22, 2005

(54) TRACK SERVO CONTROL METHOD, TRACK SERVO CONTROLLER AND OPTICAL STORAGE DEVICE

(75) Inventors: Yoshiaki Ikai, Kawasaki (JP); Shigenori Yanagi, Kawasaki (JP); Tomonori Yamashita, Hyogo (JP)

(73) Assignee: Fujitsu Limited, Kawasaki (JP)

( * ) Notice: Subject to any disclaimer, the term of this patent is extended or adjusted under 35 U.S.C. 154(b) by 598 days.

(21) Appl. No.: 10/062,834

(22) Filed: Jan. 31, 2002

(65) Prior Publication Data

US 2002/0181350 A1 Dec. 5, 2002

(30) Foreign Application Priority Data

May 31, 2001 (JP) ....................... 2001-165241

(51) Int. Cl.⁷ ............................... G11B 7/00
(52) U.S. Cl. ............... 369/44.32; 369/53.18; 369/53.23; 369/53.33
(58) Field of Search ............ 369/44.32, 53.18, 369/53.12, 53.23, 53.28, 53.33, 53.35

(56) References Cited

U.S. PATENT DOCUMENTS

| | | | |
|---|---|---|---|
| 5,233,586 A | 8/1993 | Morisada | 369/44.32 |
| 6,172,960 B1 | 1/2001 | Takemura et al. | 369/275.3 |
| 6,628,579 B2 * | 9/2003 | Watanabe et al. | 369/44.28 |

FOREIGN PATENT DOCUMENTS

| | | | | |
|---|---|---|---|---|
| EP | 1 043 715 | 10/2000 | | |
| JP | 60-39365 | 3/1985 | | |
| JP | 63-298734 | 12/1988 | | |
| JP | 3-230370 | 10/1991 | | |
| JP | 4-232617 | 8/1992 | | |
| JP | 05258383 A | * 10/1993 | ........... G11B/11/10 |
| JP | 6-76303 | 3/1994 | | |
| JP | 8-255436 | 10/1996 | | |
| JP | 8-287478 | 11/1996 | | |
| JP | 10-188290 | 7/1998 | | |
| JP | 11-203795 | 7/1999 | | |
| JP | 11-306699 | 11/1999 | | |
| JP | 2000-200449 | 7/2000 | | |
| JP | 2000339729 A | * 12/2000 | ........... G11B/7/095 |
| JP | 2001-23177 | 1/2001 | | |

* cited by examiner

Primary Examiner—David Ometz
Assistant Examiner—Jorge L. Ortiz-Criado
(74) Attorney, Agent, or Firm—Greer, Burns & Crain, Ltd.

(57) ABSTRACT

A track servo control perform follow-up control of an optical beam to a track of an optical disk, and control the vibration of the optical beam due to the ID pit noise of the optical disk. The control system is comprised of a feedback control block for feedback-controlling the actuator by the track error signal from the actuator and the learning control block. Since the optical disk ID pit noise is periodic noise, the learning control block learns this, inputs the learning result to the feedback control system. The learning result is subtracted from the learning input, and the signal after subtraction is learned in order to converge the learning. Therefore even if the periodic ID pit noise is applied, this noise can be removed from the control loop and the vibration of the actuator due to periodic noise can be decreased, making a stable track follow-up operation possible.

20 Claims, 20 Drawing Sheets

$$i_u = \text{floor}\left(\frac{t}{T}\right)$$

$$\hat{C}_{iu}(N) = \hat{C}_{iu}(L) + K_I \cdot T_S \cdot I_{FB}$$

TRACK SERVO CONTROL METHOD, TRACK SERVO CONTROLLER AND OPTICAL STORAGE DEVICE

BACKGROUND OF THE INVENTION

1. Field of the Invention

The present invention relates to a track servo control method, a track servo controller and an optical storage device for performing follow-up control of an optical beam to a track of an optical disk, and more particularly to a track servo control method, a track servo controller and an optical storage device for accurately following up an optical beam to a track of an optical disk where the ID part of the sectors are embossed.

2. Description of the Related Art

The storage capacity of an optical storage device using an optical storage medium, such as an optical disk (disk type, card type), has been improved dramatically. In an optical storage device, an optical disk storage medium having spiral type or circular type tracks is used, an optical beam of an optical head is positioned on a track, the optical beam is focused, and data on the track is read or read/written by the optical beam. A storage device where data is magnetically recorded on a magneto-optical disk by the optical beam is also defined as an "optical storage device".

For this, a track servo control for following up the optical beam to the track and a focus servo control for following up the focal position of the optical beam to the recording face of the medium are performed. For these servo controls, a focus error signal (FES) for indicating the displacement amount in the focus direction, and a track error signal (TES) for indicating the displacement amount in the track direction, are generated from the reflected light of the optical beam from the medium, and feedback control is performed so that the displacement amount becomes zero.

In such a focus or track servo control method, periodic noise may be applied to the control system. For example, as FIG. 32 shows, the optical disk medium 200 is divided into a plurality of zones 200-1 and 200-2 in the radius direction and in each zone, and a plurality of tracks 201 are formed in parallel. These tracks 201 are divided into a plurality of sectors in a circumferential direction of the medium, and a header 202, to indicate a sector mark and ID (track number, sector number), is provided at the beginning of each sector.

In the optical disk 200, this header 202 is embossed in a relief structure or in a geometric shape (here this is referred to as "pre-pit"). In other words, the header 202 is comprised of convex protrusions or concave holes formed as a geometric shape. This method allows creating a header 202 of an optical disk comprised of tens of thousands of tracks and hundreds of thousands of sectors by stamp-processing in an optical disk substrate manufacturing step, and does not require writing, as is required for a magnetic disk.

The header 202 is mechanically formed with convex/concave pits, so when the optical beam 210 travels on a track 201 of such an optical disk 200, the track error signal (TES) to be input to the positioning system changes, and the track error amount increases by the header 202 of the sector of the track 201. In other words, noise is applied to the positioning system. Since this noise depends on the header position, this noise is regarded as periodic noise.

One general countermeasure to the noise applied to the control system is decreasing the gain of the closed loop characteristic of the control system at the frequency where the noise is generated. The closed loop characteristic is given by $$PK/(1+PK) \qquad (1)$$

where P is the characteristic of the control target and K is the characteristic of the controller. Since this is a response characteristic of a position error by the noise, the influence of the noise is decreased by dropping the gain of the closed loop characteristic with an improvement of the characteristics of the controller.

A method for decreasing the noise of the ID pit (header) of a magneto-optical disk has been proposed in Japanese Patent Laid-Open No. H5-258383. As mentioned above, in a magneto-optical disk, a track on the medium is divided into small areas called "sectors", and a part recording a track number and sector number to indicate a position on the disk, called the "header (ID part)", is at the beginning of a sector.

This part is formed to be a pre-pit when the medium is created, and is comprised of physical dots. Therefore if the laser spot passes over the ID part, light is diffused and the quantity of reflected light decreases, which is observed as noise. According to the method in Japanese Patent Laid-Open No. H5-258383, the ID part detection unit detects the timing when the laser spot passes over the ID part, so that the control circuit is switched only at this time, to prevent the vibration of the actuator by noise.

A problem of the conventional method of decreasing the gain of the closed loop characteristic is the deterioration of the follow-up performance which frequently occurs. The closed loop characteristic has a close relationship with the sensitivity characteristic, which is the disturbance suppression characteristic, and this relationship is given by T+S=1, where the closed loop characteristic is T, and the sensitivity characteristic is S. Therefore the closed loop characteristic cannot be changed independently from the sensitivity characteristic, and the sensitivity characteristic often deteriorates by decreasing the gain subject to the frequency of the noise. As a result, the follow-up accuracy deteriorates even if the influence of the noise can be decreased.

In the case of the method stated in Japanese Patent Laid-Open No. H5-258383, the ID part detection unit can detect only the ID part of the zone where the optical beam is following up at that time. So the ID pit noise of the zone during follow-up can be removed quite well.

On the medium of a magneto-optical (optical) disk, tracks are curved as spirals, and several hundred to several thousand tracks are grouped in units called "zones". In some types of medium, the number of ID parts differs depending on the zone, and as FIG. 32 shows, the position of the ID part is different depending on the zone, as shown in zone 200-1 and zone 200-2. Therefore in the case of a high density optical (magneto-optical) disk, not only the ID parts of the zone being followed up but the ID parts of the peripheral zones thereof as well may be observed as noise with the track error signal (TES).

For example, FIG. 33 shows the progress of the run-out amount with respect to the time during track follow-up control of the high-density (e.g. track width is less than 1 micron) magneto-optical disk. As FIG. 33 shows, other noise which periodically occurs exists in addition to the noise generated by the ID pits of a currently following up track which appears periodically.

The noise generated by the ID pits of a currently following up track can be removed by the above mentioned conventional ID pit noise removal method, but other periodic noise cannot be removed, since the cycle is different. Especially when the track density is high as in the above mentioned case, the allowable positional error during track follow-up is small, so the influence of the above mentioned noise cannot be ignored.

SUMMARY OF THE INVENTION

With the foregoing in view, it is an object of the present invention to provide a track servo control method, a track servo controller, and an optical storage device for preventing a drop of the follow-up accuracy due to unnecessary periodic noise.

It is another object of the present invention to provide a track servo control method, a track servo controller and an optical storage device for preventing the influence of unnecessary periodic noise on the actuator without dropping the follow-up accuracy.

It is still another object of the present invention to provide a track servo control method, a track servo controller and an optical storage device for preventing the influence of various noises with different periods, and preventing the drop of the track follow-up accuracy.

It is still another object of the present invention to provide a track servo control method, a track servo controller, and an optical storage device to improve the track follow-up accuracy on a high-density optical disk.

To achieve these objects, the present invention is a track servo control method for following up an optical beam to a track of an optical storage medium, where tracks, comprised of a plurality of sectors having ID parts shaped in a relief structure, are formed, comprising: a step of observing the positional error of the optical beam from the track by a reflected light from the optical storage medium; a step of controlling an actuator which moves the optical beam by a feedback control system according to the observed positional error; a step of inputting a signal based on the observed positional error and learning the signal waveform synchronizing with the period of the ID parts; and a step of inputting the learning result to the feedback control system and controlling the vibration of the actuator by periodic noise synchronizing with the period of the ID parts, wherein the above mentioned learning step comprises a step of subtracting the learning result from the learning input and learning the learning signal after subtraction.

Since ID noise (noise caused by the relief structure of the ID part, which is comprised of a combination of convex and concave forms) is a periodic noise, the present invention controls the vibration of the actuator due to the ID noise by learning the ID noise and inputting the learning result to the feedback control system. ID noise does not disappear from the feedback control system even if vibration is controlled, so learning may not be converged. Therefore in the present invention, the learning result is subtracted from the learning input, and the learning signal after subtraction is learned so as to converge learning.

Therefore, even if periodic ID noise is applied, the noise can be removed from the control loop, and the vibration of the actuator due to periodic noise can be decreased, which makes a stable track follow-up operation possible. In other words, when a periodic noise is applied to the positioning control system, the signal waveform synchronizing with the period of the noise is learned, so that the waveform of the noise is identified, and the signal is removed from the control loop to decrease the influence of the noise.

In the present invention, it is preferable that the above mentioned learning step further comprises a step of learning a signal waveform synchronizing with the period of the ID parts of a zone adjacent to the zone of the track where the optical beam follows up, out of a plurality of zones divided for each of the plurality of tracks of the optical storage medium.

Therefore the vibration of the actuator due to the ID noise generated by the ID parts in an adjacent zone, which is a problem in high-density optical storage medium, can be decreased, and a stable track follow-up operation can be implemented.

In the present invention, it is preferable that the above mentioned learning step further comprises a step of learning a signal waveform synchronizing with the period of the ID parts of the zone adjacent inside if the track of the zone where the optical beam follows up is inside from the center of the follow-up zone, and with the period of the ID parts of the zone adjacent outside if the track is outside from the center of the follow-up zone out of the plurality of zones divided for each of the plurality of the tracks of the optical storage medium.

Therefore even for the track follow-up of a zone where zones exist on both sides, the vibration of the actuator due to the ID noise generated by the ID parts of the adjacent zone, which is a problem of a high-density optical storage medium, can be decreased, and a stable track follow-up operation can be implemented.

In the present invention, it is preferable that the above mentioned learning step further comprises a step of detecting whether the track to be followed up is inside or outside from the center of the follow-up zone by the follow-up start track position of the optical beam. Therefore even in a track follow-up of a zone where zones exist on both sides during seeking, the vibration of the actuator due to the ID noise generated by the ID part of the adjacent zone, which is a problem of a high-density optical storage medium, can be decreased, and a stable track follow-up operation can be implemented.

In the present invention, it is preferable that the above mentioned learning step further comprises a step of detecting whether the track to be followed up is inside or outside from the center of the follow-up zone by the follow-up start track position of the optical beam and the rotation numbers of the optical storage medium from the follow-up start.

Therefore even in a track follow-up of the zone where zones exist on both sides, the vibration of the actuator due to the ID noise generated by the ID parts of the adjacent zone, which is a problem of a high-density optical storage medium, can be deceased during a spiral follow-up, and a stable track follow-up operation can be implemented.

In the present invention, it is preferable that the above mentioned control step comprises a step of subtracting the learning result from the signal of the feedback control system. Therefore the ID pit noise can be removed from the control loop in the pre-stage of the actuator.

In the present invention, it is preferable that the above mentioned learning step comprises a step of learning a signal waveform synchronizing with the period of the ID parts using the command value of the feedback control system as the signal based on the observed positional error, and the above mentioned control step comprises a step of subtracting the learning result from the command value of the feedback control system. Therefore the ID noise can be removed from the control loop in the pre-stage of the actuator.

In the present invention, it is preferable that the above mentioned learning step comprises a step of learning a signal waveform synchronizing with the period of the ID parts using an input for the input signal of the feedback control system as the signal based on the observed positional error, and the above mentioned control step comprises a step of subtracting the learning result from the input signal of the feedback control system. Therefore the ID noise can be removed from the control loop in the input stage of the feedback control block. Also de-tracking can be accurately detected.

In the present invention, it is preferable that the above mentioned learning step comprises a step of learning a signal waveform synchronizing with the period of the ID parts using the command value of the feedback control system, and outputting the learning result where phase has advanced, and the above mentioned control step comprises a step of adding the learning result to the command value of the feedback control system.

Therefore the vibration of the actuator due to the ID noise can be decreased by the operation of the actuator and the learning operation of the control loop.

DESCRIPTION OF THE PREFERRED EMBODIMENTS

Embodiments of the present invention will now be described in the sequence of the optical storage device, track servo controller, learning control block, other embodiments, and examples, but the present invention shall not be restricted by these embodiments.

[Optical Storage Device]

Figure 1:
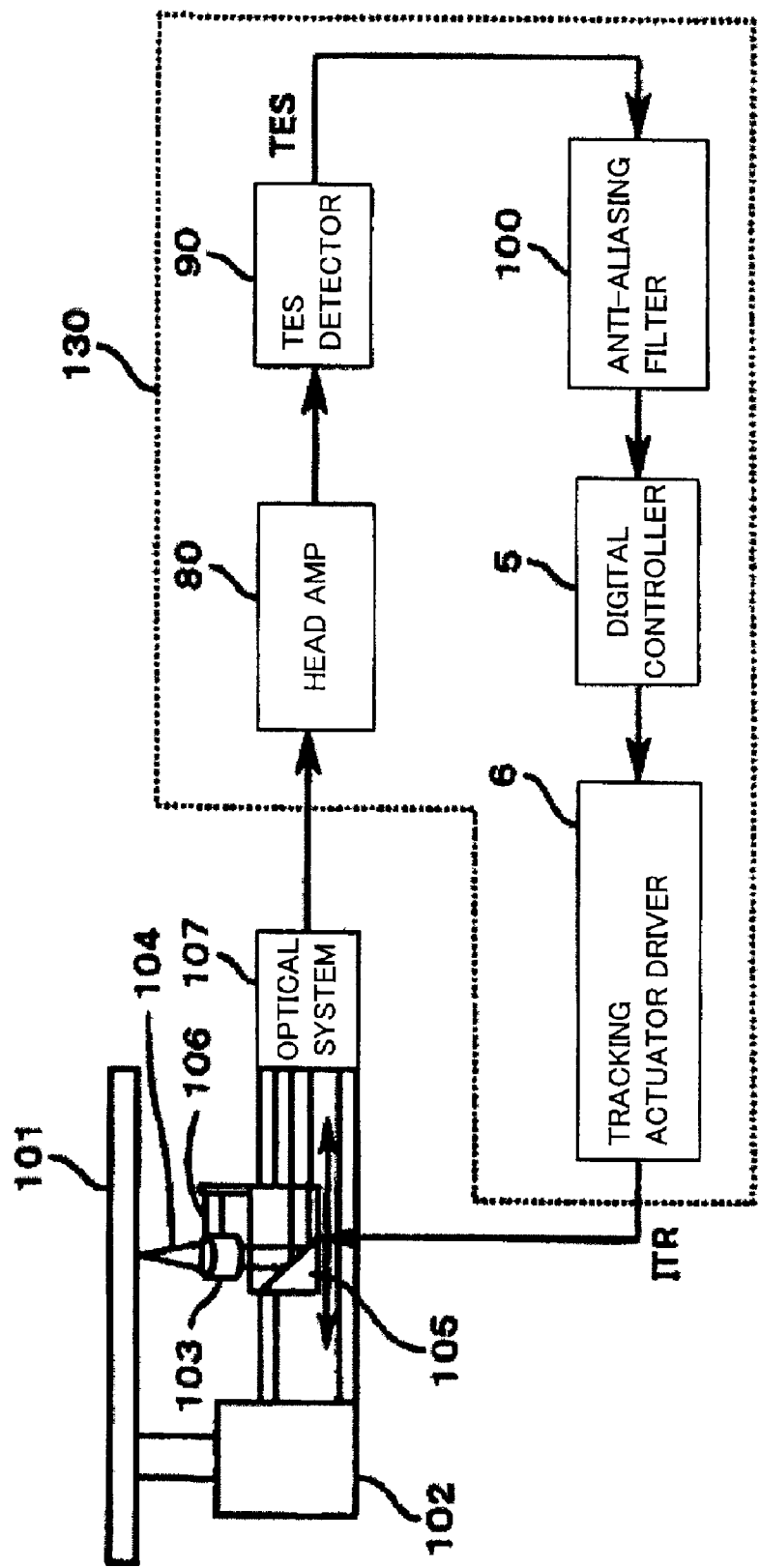
FIG. 1 is a block diagram of an optical disk of an embodiment of the present invention.

FIG. 1 is a block diagram of an optical disk device of an embodiment of the present invention, where a magneto-optical disk device is shown as the optical disk device. Here parts that are not directly related to the description of the present embodiment, such as a playback signal processing circuit, an interface circuit for the host computer, and a focus control circuit, are omitted.

As FIG. 1 shows, the optical disk device is loaded an optical magneto-optical disk 101 having information tracks for recording information, and comprises a spindle motor 102 for rotating the magneto-optical disk 101.

The optical disk device also comprises an optical head for recording and reading information for the magneto-optical disk 101. The optical head comprises an objective lens 103 for irradiating the optical beam 104 on the information tracks on the magneto-optical disk 101, a focus actuator 106 which is a focus moving means for driving the objective lens 103 in the optical axis direction (vertical direction in FIG. 1, that is, the focusing direction), a carriage (actuator) 105, which houses the objective lens 103 and the focus actuator 106 and can move in the radius direction of the magneto-optical disk 101, and an optical system 107 which includes a laser diode to be a light source, and a photo-detector.

The tracking control circuit 130 comprises a head amplifier 80 for amplifying the output current of the photo-detector, a tracking error signal detection circuit (TES detection circuit) 90 for detecting the tracking error signal based on the output of the photo-detector, a low pass filter (anti-aliasing filter) 100 for removing the high frequency components of TES for the purpose of stabilizing the tracking control system, a digital servo controller 5 for generating the servo control signal from the tracking error signal, and a tracking actuator driver (amplifier) 6 for supplying the drive current to the coil to drive the carriage 105 based on the output signal of the digital servo controller 5.

This carriage 105 comprises an actuator, such as a voice coil motor, which moves with the objective lens 103 and the focus actuator 106 in the direction of crossing the information tracks on the optical disk 101 (horizontal direction in FIG. 1, that is, the tracking direction) by the drive current ITR supplied from the tracking actuator driver 6, so that the optical beam 104 can irradiate all the information tracks.

In the configuration of this carriage 105, the focus actuator 106 is comprised of, for example, a holder for securing the objective lens 103, a plate spring which roughly secures the objective lens 103 in the tracking direction so as to be movable in the focusing direction, and a focus coil for driving the objective lens 103. And the carriage 105, where the focus actuator 106 is mounted on top, has a tracking coil on both sides as a carriage driving means (actuator) for driving the carriage.

By comprising the optical head by assembling the carriage 105 with the above configuration together with the guide shaft and the magnetic circuit along the carriage 105, the focus actuator 106 can be driven in the focusing direction when power is supplied to the focus coil, and the carriage 105 can be driven in the tracking direction when power is supplied to the tracking coil. Since the optical beam 104 is also driven in the tracking direction when the carriage 105 is driven, the tracking actuator is configured by these components.

As mentioned later, the digital servo controller 5 is comprised of an AD converter which converts the analog track error signal TES, which is an observation signal, into a digital value, a DSP (Digital Signal Processor) for performing signal processing on this digital value, and a DA converter which converts the digital drive voltage of the DSP into an analog drive voltage.

Now the operation of the tracking control system with this configuration will be described. First the spindle motor 102 is rotated at a predetermined speed by a motor control circuit, which is not illustrated, and the laser diode included in the optical system 107 is emitted at a predetermined output based on the drive control of the laser control circuit, which is not illustrated.

Then a focus control circuit, which is not illustrated, controls the drive of the focus actuator 106, and controls the position of the objective lens 103 in the focusing direction, so that the optical beam 104 focuses on the information tracks of the optical disk 101. The reflected light of the optical beam 104 from the optical disk 101 is received by the photo-detector of the optical system 107, is amplified by the head amplifier 80, and is output to the tracking error signal detection circuit 90.

In this state, the tracking error signal detection circuit 90 generates the tracking error signal TES, which indicates how much the position of the optical beam 104 deviated from the center of an information track, based on the output of the photo-detector. Normally the tracking error signal becomes zero level at the center of an information track, roughly at the center between tracks, and shapes a sine wave with respect to the displacement of the optical beam.

After the tracking error signal that is the output of the tracking error signal detection circuit 90 is removed its high frequency component (noise component), the removed tracking error signal is servo-computed by the servo controller 5, and is negatively fed back to the carriage 105 by the tracking actuator driver 6 as the drive current ITR. The carriage 105 is driven by this drive current ITR in a direction to correct the displacement of the optical beam 104 detected by the tracking error signal detection circuit 90.

In this way, by feeding back the tracking error signal to the tracking coil for driving the carriage, the position of the optical beam 104 in the tracking direction is driven so that the tracking error signal becomes zero, and tracking is controlled so that the optical beam 104 follows up to the center of the information track.

The present invention was described using a magneto-optical disk as the optical disk, but the present invention can be applied to other optical disk devices.

Figure 2A:
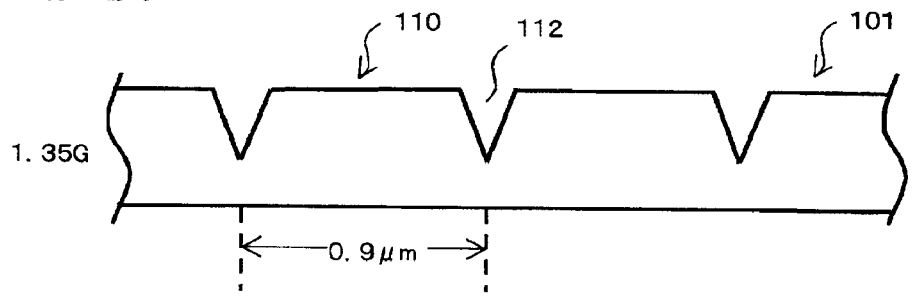
FIGS. 2A and 2B are cross-sectional views of the optical disk medium in FIG. 1.
Figure 2B:
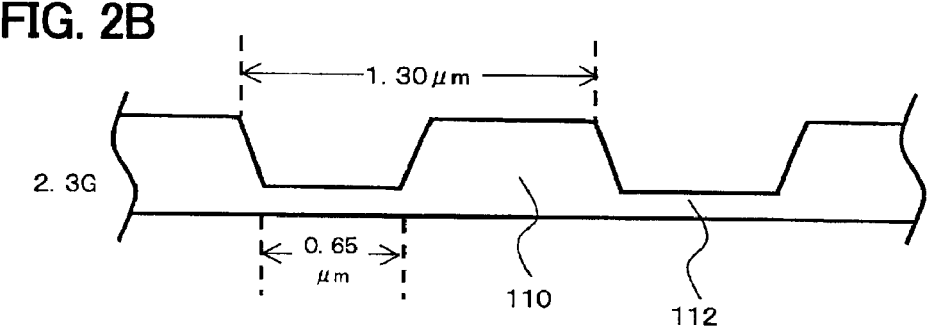
Figure 3:
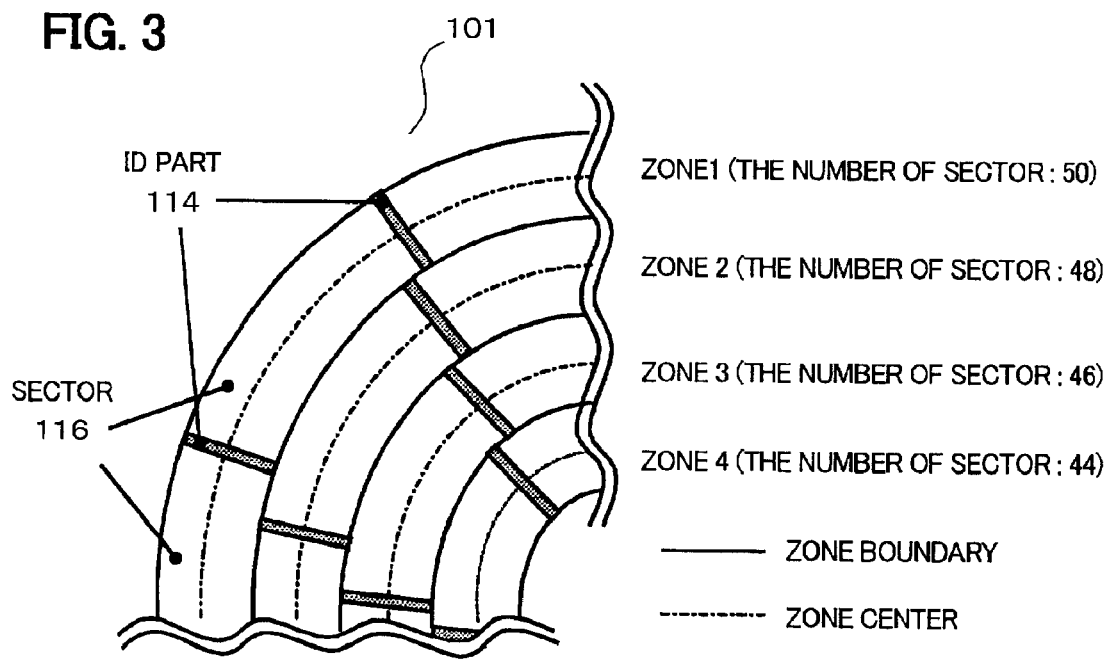
FIG. 3 is a diagram depicting the relationship of the zones, ID parts and sectors of the optical disk medium in FIG. 1.
Figure 4:
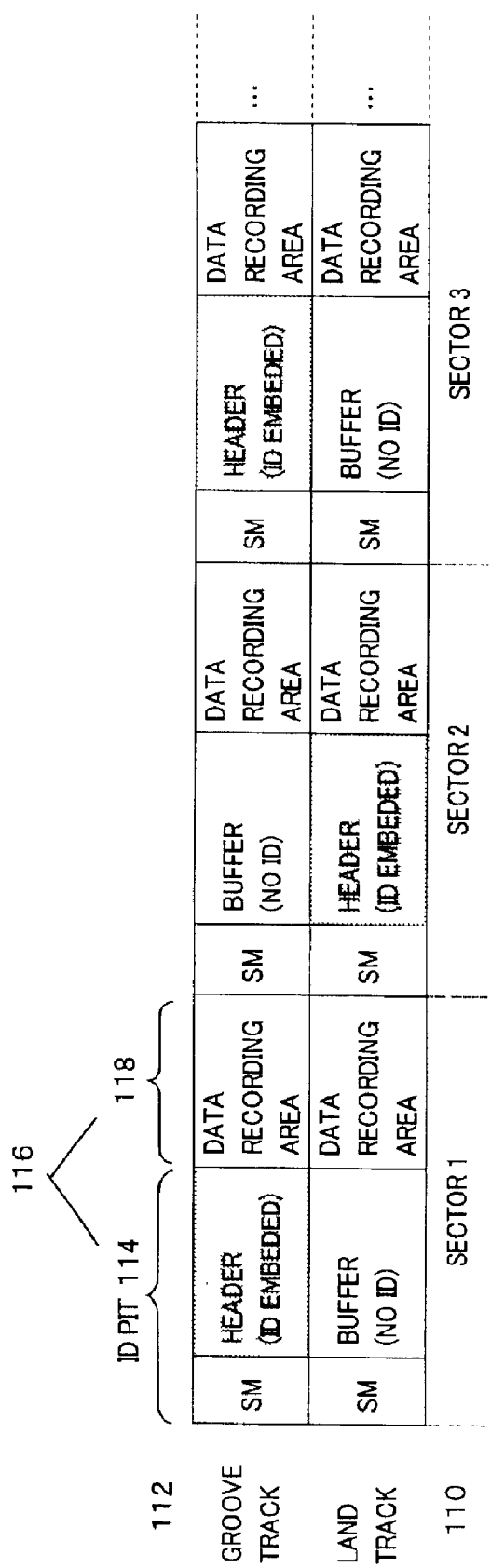
FIG. 4 is a diagram depicting the format of the land/group recording medium in FIG. 2.
Figure 5:
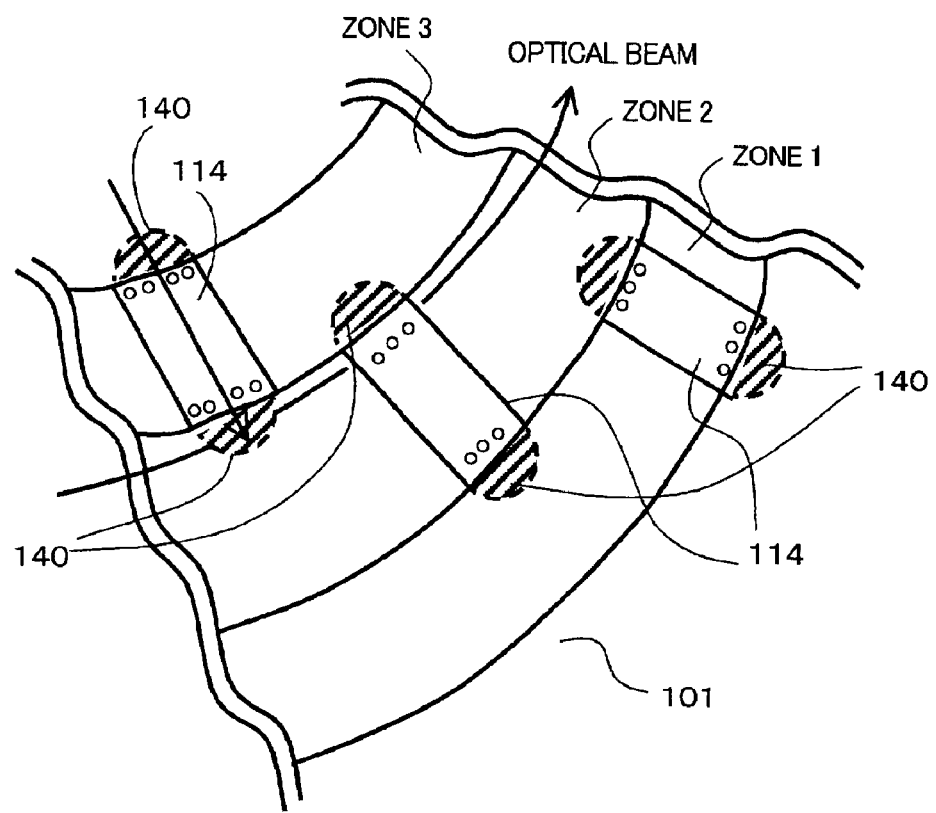
FIG. 5 is a diagram depicting the ID pit noise of the optical disk in FIG. 1.
Figure 6A:
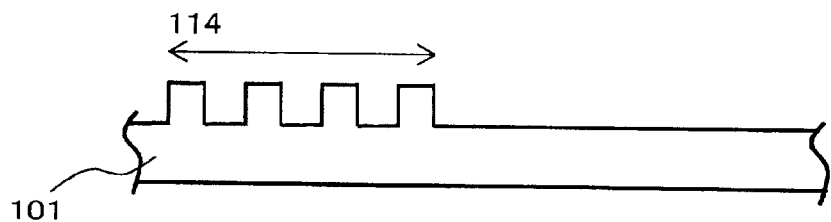
FIGS. 6A and 6B are diagrams depicting the ID pit part and zone in FIG. 5.
Figure 6B:
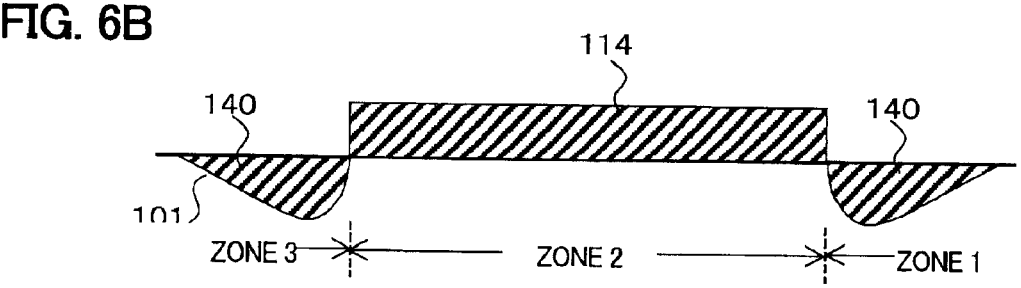
Figure 7:
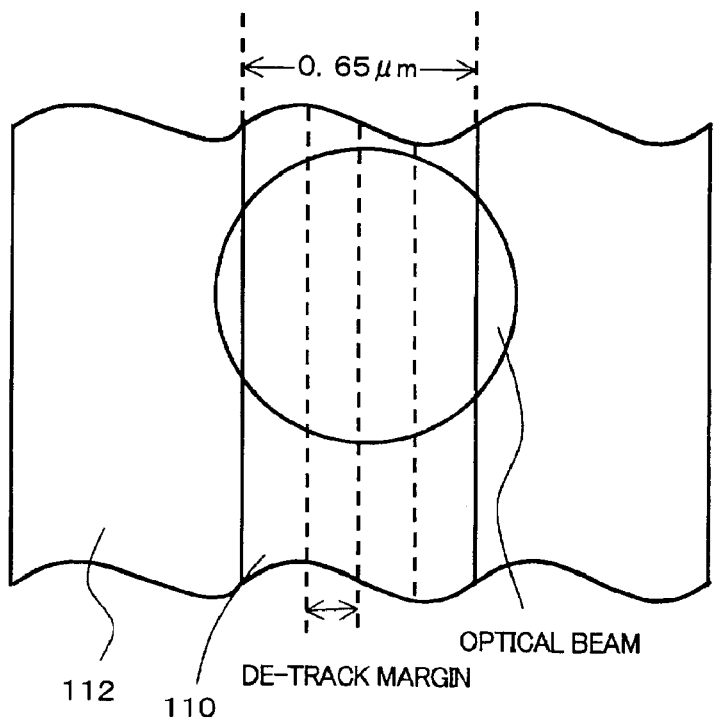
FIG. 7 is a diagram depicting the optical beam follow-up operation of the track of the land/group recording medium in FIG. 4.

Now the optical disk 101 in FIG. 1 and the cause of the periodic noise will be described. FIGS. 2A and 2B are cross-sectional views of the magneto-optical disk 101 in FIG. 1, FIG. 3 is a top view of the magneto-optical disk 101, FIG. 4 is a data format diagram of the magneto-optical disk, FIG. 5 and FIGS. 6A and 6B are diagrams depicting the periodic noise, and FIG. 7 is a diagram depicting the track error margin.

FIG. 2A is a cross-sectional view of the magneto-optical disk 101 with a 1.35 GB capacity, where the land 110 is separated by the groove 112, and data is recorded only on the land 110. Therefore, the groove 112 merely has the function of separating the land 110, and the width of the land 110 can be about 0.9 $\mu$m.

FIG. 2B, on the other hand, is a cross-sectional view of the magneto-optical disk 101 with a 2.3 GB capacity, where data is recorded on both the land 110 and the groove 112. Therefore, the width of the groove 112 and the width of the land 110 are the same, which is 0.65 $\mu$m, narrower than the width in FIG. 2A.

In the case of such a high-density magneto-optical disk, the size of the optical beam is about 0.9 $\mu$m in diameter, so the track error margin is small, and in particular is even smaller in the case of land/groove recording.

As the top view in FIG. 3 shows, tracks are curved in a spiral shape on the medium 101 of the magneto-optical (optical) disk, where several hundred to several thousand tracks are grouped into units called "zones". Each track is divided by a plurality of sectors 116 which have the same length, and a header (ID part) 114 is created at the beginning of the sector 116. A sector mark, ID (track address, sector address), and a control signal (e.g. VFO pattern) are formed on the header 114 in a pre-pit format.

Since the magneto-optical disk 101 is rotated at a predetermined rotation frequency, the relative speed of the optical beam and the magneto-optical disk 101 is different between the inner circumference and the outer circumference of the disk 101. Therefore the so called "zone CAV (Constant Angular Velocity)", where the recording frequency is lower in the zones at the inner circumference side and the recording frequency is higher in the zones at the outer circumference side, is used to increase the recording capacity.

In the case of a medium 101 using ZCAV, the number of ID parts 114 of each track and the positions thereof are different depending on the zone. In FIG. 3, for example, the number of sectors is "50" in zone 1, the number of sectors is "48" in zone 2, the number of sectors is "46" in zone 3, and the number of sectors is "44" in zone 4, where the number of sectors decrease moving toward inner zones, and the positions of the ID parts 114 of the sector 116 are different depending on the zone.

FIG. 4 shows the track format of the groove/land recording magneto-optical disk 101 in FIG. 2B, which is disclosed, for example, in Japanese Patent Laid-Open No. 2001-23177. For the groove track 112 and the land track 110, single header (identification information) 114 is set for 2 sectors 116, and the position of the header 116 is shifted (alternately in sector units in this case) between the land track 110 and the groove track 112.

Here the header 114 is comprised of a sector mark SM and an ID, and the ID is further comprised of a track address, sector address, CRC, and VFO pattern. For a sector where the header 114 is not set, only the sector mark SM is set. This header 114 is 70 bytes length, for example, and the subsequent data area 118 is 2560 bytes length, for example.

As FIG. 6A shows, this sector mark SM and the ID are formed by convex/concave pre-pits. These pre-pits are formed by stamping-formation of resin (e.g. polycarbonate) of the magneto-optical disk substrate along with the track. At this time, stress is applied to the zones on both sides of the zone where the pre-pits 114 are formed, where residual stress 140 is generated, as shown in FIG. 5 and FIG. 6B.

Figure 33:
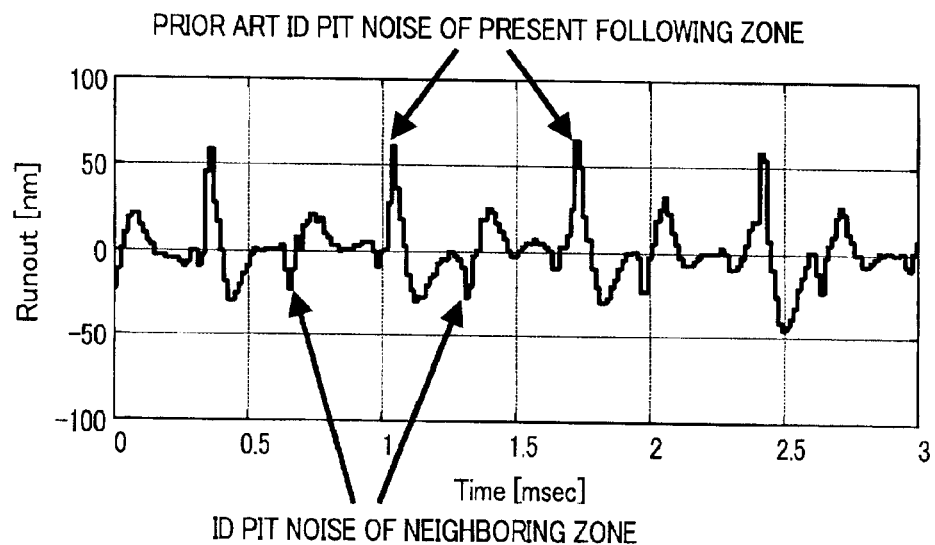
FIG. 33 is a diagram depicting the periodic noise generated by the ID pit of a prior art.

In the residual stress part 140, the optical double refraction index is changed by photo-elasticity. As a result, as shown in FIG. 5, light scatters at the residual stress part 140 (position of ID part 114 of adjacent zone 3) by the adjacent zones of the track when the optical beam passes through the tracks of a zone (e.g. zone 2), and appears as noise, as shown in FIG. 33.

If this noise affects the control of the actuator, the actuator unnecessarily vibrates, that is, a track error amount is generated and the actuator vibrates, although the optical beam follows up the track. Especially in land/groove recording, the diameter of the optical beam is 0.9 $\mu$m, while the width of 1 track is 0.65 $\mu$m, as FIG. 7 shows, and the de-track margin for detecting de-tracking is small, which is 0.18 $\mu$m, for example. Therefore the de-track margin is easily exceeded if the actuator is vibrated by the above mentioned ID noise of an adjacent zone.

In the present invention, the control system learns this noise according to the period of the ID parts 114 of an adjacent zone, since the noise is a periodic noise which is generated at the position of the ID parts 114 of the adjacent zone, and removes the noise from the control system.

In the above description, the present invention was described using a magneto-optical disk, but the present invention can be applied to other optical disks where a similar phenomena is also generated. The present invention can be applied not only to land/groove recording but also to land recording alone. The optical disk is not limited to having a disk shape, but can also be one having a card (square) shape.

[Track Servo Control Mechanism]

Figure 8:
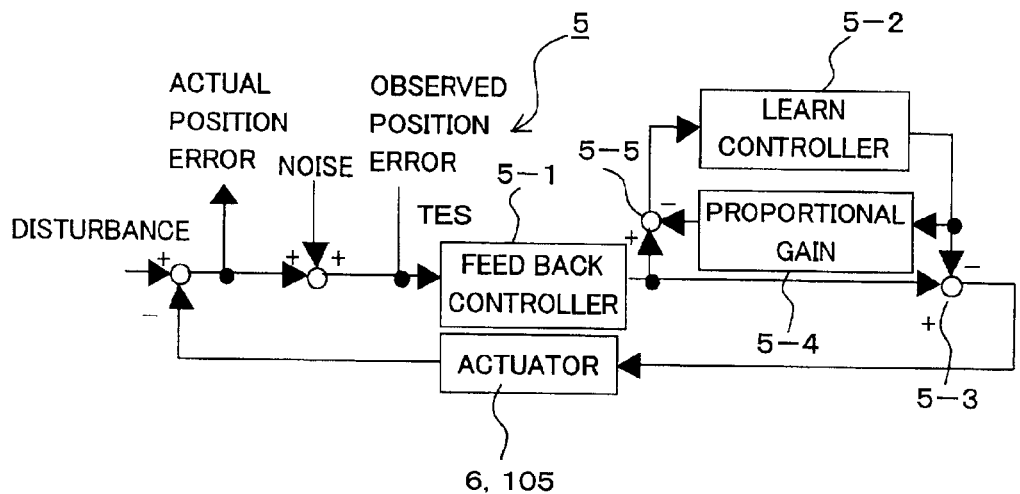
FIG. 8 is a block diagram depicting an embodiment of the track servo control system in FIG. 1.
Figure 9:
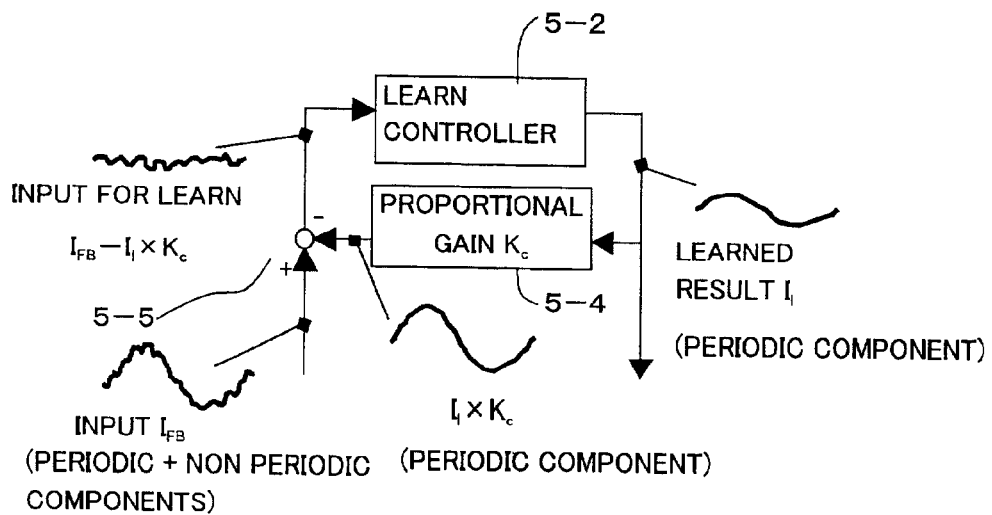
FIG. 9 is a diagram depicting the feedback type learning control block in FIG. 8.
Figure 10:
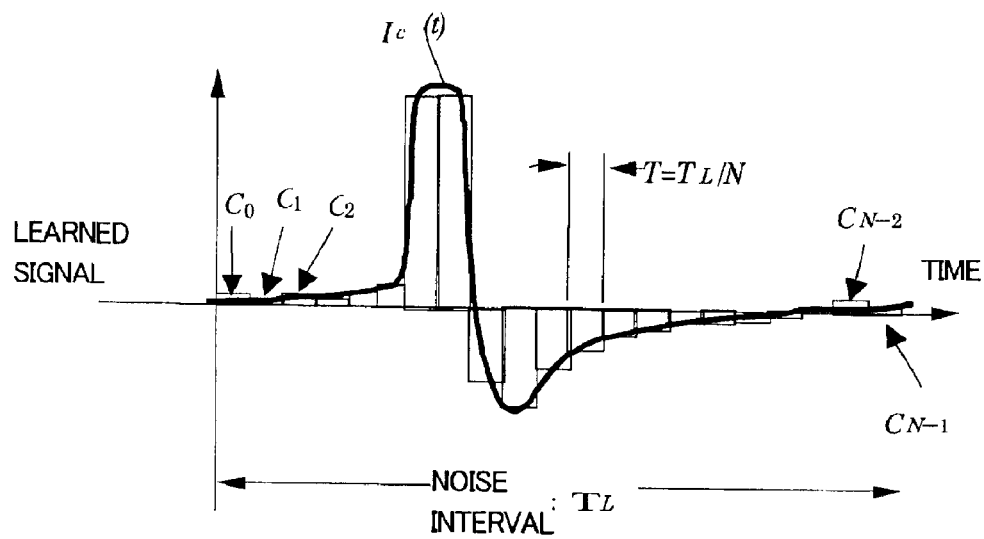
FIG. 10 is a diagram depicting the learning principle of the learning control block in FIG. 8.
Figure 11:
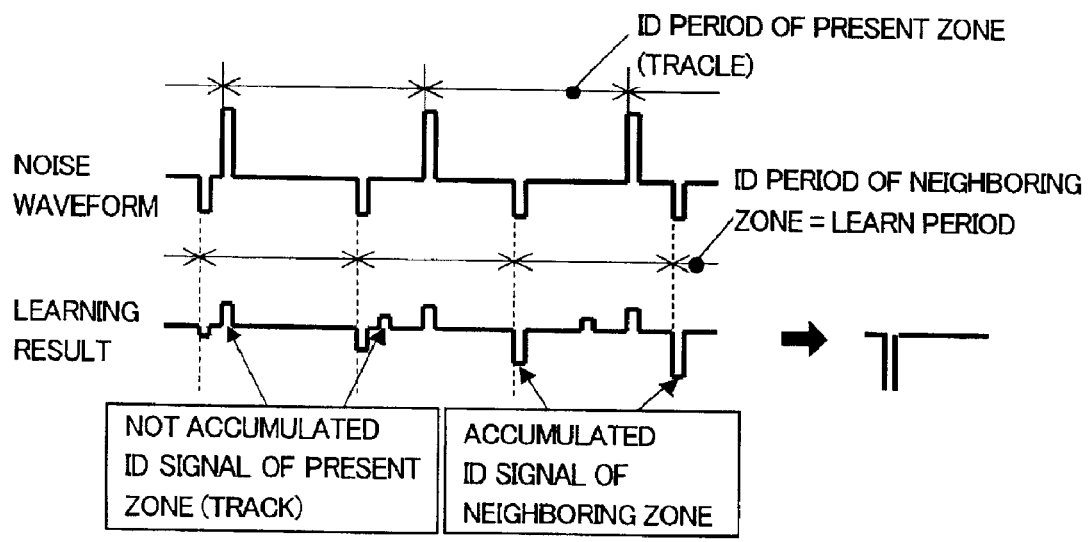
FIG. 11 is a diagram depicting the ID pit noise waveform identification operation of the learning control block in FIG. 8.
Figure 12:
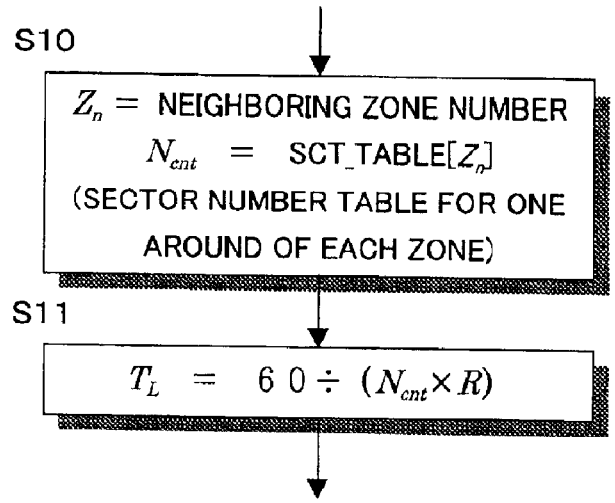
FIG. 12 is a flow chart depicting the learning timing calculation processing of an embodiment of the learning control block in FIG. 8.
Figure 13:
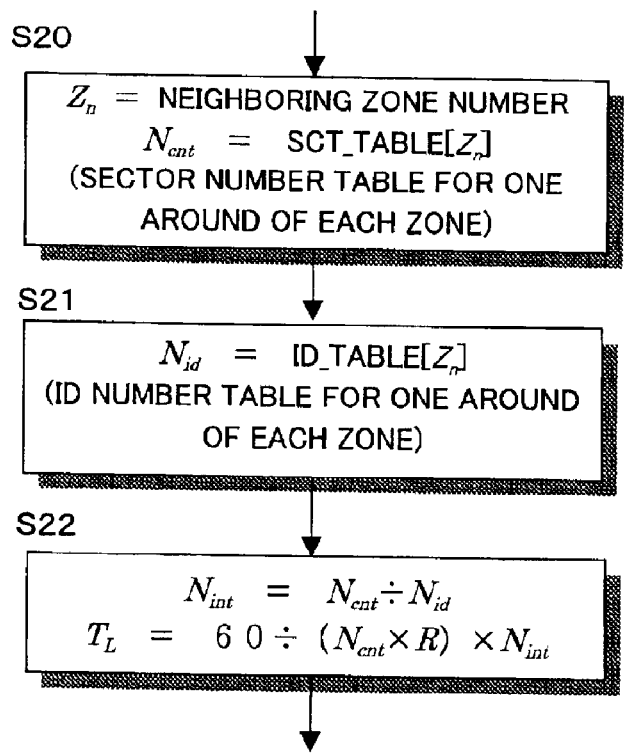
FIG. 13 is a flow chart depicting the learning timing calculation processing of another embodiment of the learning control block in FIG. 8.
Figure 14:
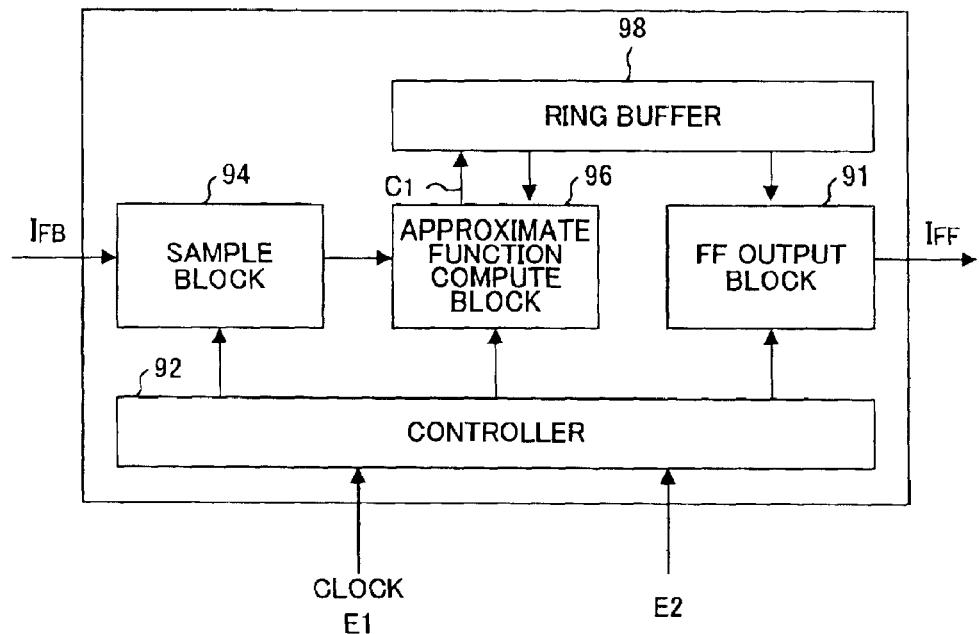
FIG. 14 is a functional block diagram of the learning control block in FIG. 8.
Figure 15:
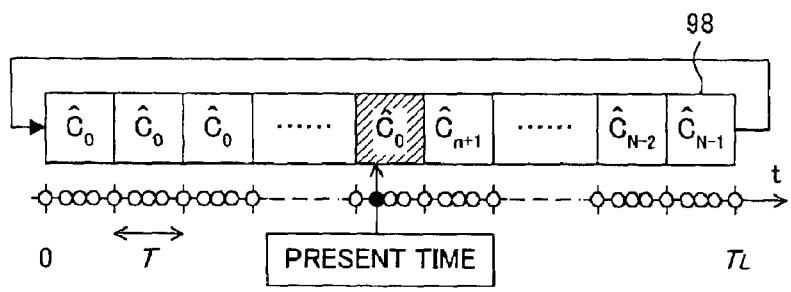
FIG. 15 is a diagram depicting the learning operation of the learning control block in FIG. 14.

FIG. 8 is a block diagram depicting the feedback control system of the track servo control mechanism in the optical disk device of an embodiment of the present invention, FIG. 9 is a diagram depicting the learning control block thereof, FIG. 10 is a diagram depicting the learning algorithm in FIG. 8, FIG. 11 is a diagram depicting the noise learning operation in FIG. 8, FIG. 12 is a flow chart depicting the learning period decision processing in FIG. 8, FIG. 13 is a flow chart depicting another learning period decision processing in FIG. 8, FIG. 14 is a functional block diagram of the learning control block thereof, and FIG. 15 is a diagram depicting the learning memory update operation in FIG. 10.

FIG. 8 shows the feedback control system of the track servo control mechanism of the digital controller 5 in FIG. 1, and in this embodiment, a learning control block is provided between the feedback control block and the carriage drive block of an actuator (carriage).

In FIG. 8, the feedback control system of the track servo mechanism is comprised of a feedback control block 5-1, learning control block 5-2, adders 5-3 and 5-5, and proportional gain multiplication block 5-4.

The observed positional error signal inputted to the feedback control block 5-1 is the track error signal TES of the TES detection circuit 90 in FIG. 1. As described above, the tracking error detection circuit 90 generates the tracking error signal TES to indicate the dislocation amount from the track center by the return light of the optical beam from the medium 101 caused by the objective lens 103 mounted on the carriage 105.

During follow-up of the track, this observation positional error signal (tracking error signal TES) is a signal waveform where the above mentioned periodic noise generated by the ID parts is added to the actual positional error, which is subtracted the dislocation of the actuator from the disturbance of the medium 101 due to such a cause as an eccentricity.

The feedback control block 5-1 receives the tracking error signal TES, and calculates the feedback command value IFB for moving the carriage (actuator) 105 by the carriage drive block 6, so that the tracking error signal TES becomes zero, that is, the dislocation of the optical beam from the track center is eliminated.

The feedback control block 5-1 calculates the control signal IFB by a known operation based on an equation of state or PID operation, for example, and this control signal IFB becomes the feedback current command value set to the carriage drive block 6.

The learning control block 5-2 is inputted the control signal IFB, which is the feedback current command value output from the feedback control block 5-1, and acquires the learning control signal which is an approximate function of an unknown drive current function by a learning rule. In the present invention, the learning control block 5-2 is operated at the period of the noise, the signal waveform synchronizing with the period of the noise is learned, and the waveform of the noise is identified. And the adder 5-3 subtracts the learning result from the feedback command value IFB and removes the signal from the control loop.

Therefore the periodic noise can be removed from the control loop even if period noise is applied, the vibration of the actuator due to the periodic noise can be prevented, and a stable track follow-up operation becomes possible. In other words, when periodic noise is applied to the positioning control system, system identify the waveform of the noise by learning the signal waveform synchronizing with the period of the noise, and remove the signal from the loop, so as to lessen the influence of the noise.

For the learning of the signal waveform by the learning control block 5-2, a method stated in Japanese Patent Laid-Open No. 2000-339729, for example, can be used. The learning control block 5-2 will be described later with reference to FIG. 14 and FIG. 15, but now the principle of this learning method will be described with reference to FIG. 10 and FIG. 11.

As FIG. 10 shows, when the period of the signal to be learned is TL, a block having the number i=0 to (N−1) when TL is divided by N is created, and the rectangular height Ci of each block is acquired by the learning algorithm to copy the signal. With the learning algorithm in this case, Ci is changed (updated) to be $$dCi/dt = Kl \circ IFB(t) \quad (2)$$

where the input signal to the learning control block 5-2 is IFB, and the learning gain is Kl.

In other words, if IFB (t) is positive at a certain point, Ci corresponding to this point increases, and if IFB (t) is negative, Ci decreases. When the periodic component Ic (t), included in IFB (t), disappears and only non-periodic components are in IFB (t), Ci converges and learning completes.

With this learning method, however, Ci continues increasing or decreasing, and learning does not converge unless the periodic component included in IFB (t) to be input to the learning control block 5-2 disappears. In the case of the learning control disclosed in the above mentioned patent, which is for learning the eccentricity disturbance of the medium 101, if the periodic component is learned and is feed-forward output, the actuator follows up eccentricity, and the periodic component in the input signal disappears.

In the case of the present invention, however, the target periodic noise is removed from the control loop so that the actuator does not follow-up the periodic noise, and the periodic noise is constantly applied to the track error signal TES, so the periodic component does not disappear from the input signal. Therefore learning does not converge even if the disclosed learning control is applied as is.

To converge this learning in the present invention, a feedback loop is installed so that the periodic component, which the learning control block 5-2 learned, is removed from the input IFB (t), and is input to the learning control block 5-2. In other words, as FIG. 8 and FIG. 9 show, the proportional gain multiplication block 5-4 and the adder 5-5 are added, and a loop, to acquire input to the learning control block 5-2 by multiplying the output (learning result) of the learning control block 5-2 by the gain Kc by the proportional gain multiplication block 5-4 and the multiplication result is subtracted from the input IFB (t) by the adder 5-5, is installed.

In this way, the periodic component included in the input signal of the learning control block 5-2 decreases as the learning of the learning control block 5-2 advances. For example, of the gain Kc is "2", then the periodic component is removed from the input signal to be input to the learning control block 5-2, and learning converges when the amplitude ratio between the learning result I1 and the periodic component included in the input signal IFB becomes 1:2.

In other words, the learning result I1 (periodic component) converges when the input (IFB−I1 o Kc) of the learning control block 5-2 becomes only a non-periodic component. The result when the learning control block 5-2 learns in such a way is subtracted from the control loop by the adder 5-3. By this subtraction, the periodic noise component can be removed.

With this method, periodic noise can be removed without changing the closed loop characteristic and sensitivity characteristic of the control system, so the deterioration of the follow-up performance can be prevented. Even if the waveform of the periodic noise is an unknown function, a waveform synchronizing with the period of the noise can be learned only if the period is known, and the noise can be removed from the control loop.

In other words, in order to control the ID pit noise of the magneto-optical disk, the period of the ID part of an adjacent zone is set for the period TL of the learning control block 5-2. By this, it is possible to learn the periodic noise (ID pit noise) generated by the ID part (pit) of an adjacent zone.

The above mentioned learning algorithm learns an unknown function essentially by an integration operation. Also as described in FIG. 3, in the optical disk 101, the sector length of each zone is set to be the same, and the number of sectors in each zone is different, so the period of the ID part in each zone when the optical disk rotates is different.

Therefore as FIG. 11 shows, the learning control block 5-2 can learn the periodic noise (ID pit noise) generated by the ID part (pit) of the adjacent zone of the track of the zone where the optical beam is currently passing by setting the period of the ID parts of the adjacent track to the period TL of the learning control block 5-2 when the track of the current zone is passed, and this periodic noise can be removed from the control loop. Therefore the vibration of the actuator due to the period noise generated by the ID part of the adjacent zone can be prevented.

At this time, as FIG. 11 shows, the noise generated by the ID parts of the track of the zone where the optical beam is currently passing do not accumulate, since the period is different from the learning period TL being set, and only the periodic noise (ID pit noise) generated by the ID parts (pit) of the adjacent zone can be learned. The noise generated by the ID parts of the track of the zone where the optical beam is currently passing is removed by the noise removal method based on the ID part detection means disclosed in the above mentioned Japanese Patent Laid-Open No. H5-258383.

FIG. 12 is a flow chart depicting the period setup processing of the ID parts of the adjacent zone, where a general control block, which is not illustrated in FIG. 1, for controlling the entire feedback control system in FIG. 8, executes this flow.

(S10) This step determines the number Zn of the zone adjacent to the zone where the optical beam is currently passing, and determines the number of sectors Ncnt of the zone Zn from the table SCT_TABLE for storing the number of sectors for 1 round of each zone.

(S11) This step calculates the period TL of the ID part of the adjacent zone Zn from the rotation frequency of the medium R and Ncnt using the following formula (3). The result is set to the learning control block 5-1.

$$TL = 60/(Ncnt \cdot R) \quad (3)$$

By calculating the period of the ID pit noise of the adjacent zone from a known number of sectors and the rotation frequency of the medium at that point as above, the synchronization timing for learning the ID pit noise of the adjacent zone can be created.

FIG. 13 is a flow chart depicting another period setup processing of the ID part of the adjacent zone, where a general control block, which is not illustrated in FIG. 1, for controlling the entire feedback control system in FIG. 8, executes this flow.

(S20) This step determines the number Zn of the zone adjacent to the zone where the optical beam is currently passing, and determines the number of sectors Ncnt of the zone Zn from the table SCT_TABLE for storing the number of sectors for 1 round of each zone.

(S21) This step determines the number of the IDs Nid for 1 round of the zone from the table ID_TABLE for storing the number of IDs for 1 round of each zone.

(S22) This step calculates the number of sectors Nint of 1 ID part using the following formula (4). And calculates the period TL of the ID parts of the adjacent zone Zn from the rotation frequency of the medium R, Ncnt and Nint, using the following formula (5). The result is set to the learning control block 5-1.

$$Nint = Ncnt/Nid \quad (4)$$

$$TL = 60 \cdot Nint/(Ncnt \cdot R) \quad (5)$$

By calculating the period of the ID pit noise of the adjacent zone from a known number of sectors, the number of IDs and the rotation frequency of the medium at that point as mentioned above, the synchronization timing for learning the ID pit noise of the adjacent zone can be created even if the number of sectors and the number of IDs for 1 round are different.

In the case of the land/groove recording medium in FIG. 2B and FIG. 4, 2 sectors are provided for single ID part, so this method can be used. When the focus is on the land, the ID part of the groove outside the focus is not observed as noise, so the setting can be a 2 sector period.

This method will now be described using an example of calculation of the synchronization timing of the ID pit noise inside zone 1 while the optical beam is following up outside zone 2 on the magneto-optical disk 101 shown in FIG. 3.

In this example, it is assumed that the number of sectors in 1 round of the medium in zone 1 is "50", and the rotation frequency of the medium is 3600 rpm. When the ID part is in all the sectors, the synchronization timing TL is $60/(50 \times 3600) = 3.33e-4$ sec. according to formula (3). Therefore it is possible to suppress the ID pit noise of zone 1 by executing learning at synchronization timing 3.33e−4 sec.

When the ID is not in all the sectors but 1 ID is in every 2 sectors, the synchronization timing TL is $60/(50 \times 3600) \times 2 = 6.67e-4$ sec., and when 1 ID is in every 3 sectors, the synchronization timing is $60/(50 \times 3600) \times 3 = 1.0e-3$ sec. according to formula (5).3

The feedback control block 5-1, learning control block 5-2, proportional gain multiplication block 5-4, and the adders 5-3 and 5-5 are implemented by such a processor as DSP.

[Learning Control Block]

An example of the learning control block 5-2 in FIG. 8 will now be described with reference to FIG. 14 and FIG. 15. FIG. 14 is a functional block diagram depicting the learning control block 5-2 in FIG. 8. In FIG. 14, the learning control block 5-2 is comprised of the control block 92, sample processing block 94, approximate function operation block 96, ring buffer memory 98, and feed-forward output block (hereafter "FF output block") 91.

In the control block 92, a clock signal E1 and an index signal E2, which is acquired synchronizing with the above mentioned setup period, is input. Specific processing in the learning control block 5-2 is sequentially executed independently from the period TL to provide the time resolution of the functional approximation at an arbitrary period Ts, which is shorter than the period TL. In the present embodiment, Ts is a period which is the same as the sampling period of the feedback control system, and processing in the learning control block is executed at the sampling period.

The learning mode outputs the latest learning result sequentially synchronizing with the setup period while learning (updating) the learning control signal to be the approximate function of the periodic disturbance compensation signal according to a learning rule, and removes the periodic noise from the feedback control system.

For this, the control block 92 operates the sample processing block 94, approximate function operation block 96, ring buffer memory 98, and the FF output block 91. And the operation result of the approximate function operation block 96 is integrated by the corresponding memory cell of the ring buffer memory 98 according to the later mentioned learning rule, and at the same time, the FF output block 91 reads the operation result of the corresponding memory cell of the ring buffer memory 98, and subtracts the result from the feedback command value using the adder 5-3 in FIG. 8.

In the present embodiment, the sampling period of the feedback control block 5-1 and the learning control block 5-2 are the same period Ts, which means that a series of learning processing are executed at every Ts. Recently processing are normally executed by a digital operation, and are implemented by firmware on the fixed point DSP5, for example.

Learning processing includes the update processing and the learning result output processing of the ring buffer memory 98. For the update processing, the approximate function operation block 96 in FIG. 14 calculates the memory cell number (cell address i) to be updated by the learning algorithm for the time-progress in the period TL from the time t=0 when the index signal E2 is received until the time when the index signal E2 is received next, reads the value stored in the calculated memory address in the ring buffer memory 98, updates the above mentioned read value using the output value of the sample processing block 94, and writes the update result to the original memory cell.

For the learning result output processing, the memory cell number to be the learning output target is selected, the learning control output value I1 is computed, and the output value is output. In other words, the control block 92 operates the ring buffer memory 98 and the FF output block 91. The control block 92 reads the learning control signal as the learning result stored in each memory cell of the ring buffer memory 98 at the reading period, which is the same as the sampling period Ts in update mode, synchronizing with the index signal E2 which is received at every setup period, calculates the output value by the FF output block 91, and outputs the output value to the adder 5-3 in FIG. 8. This FF output block 91 executes the linear interpolation of the read signal, and computes the output value for each period Ts. Therefore smooth output can be acquired.

This learning processing will now be described in detail with reference to FIG. 15.

[1] Selecting the Target Memory Cell Number to Be Updated by Learning Algorithm

Based on the time t ($0 \leq t < TL$, TL is the setup period) synchronizing with disk rotation, the memory cell to be the update target is selected according to the learning algorithm. Time t is measured by the timer, which is initialized at each disk setup period, and is acquired by reading this timer.

The learning result is stored in the ring buffer 98 having length N, as shown in FIG. 15. FIG. 15 depicts the relationship between each memory cell and time t. As FIG. 15 shows, N number of memory cells are assigned for the time at the setup period TL at each time space T. Mark 'O' indicates the sampling period Ts for executing a series of feedback control operations and learning control operations.

Based on the time t read from the timer, the memory cell number iu to be the update target (in FIG. 15, this is equivalent to the number of suffix i of $c^i$) is selected by the following operation, for example.

$$iu = \text{floor}(t/T) \quad (6)$$

The floor (x) function indicates an integer which is equal to or small than the argument x. For example, if the argument x in ( ) is ($0 \leq x < 1.0$), then floor (x)=0. If the argument x in ( ) is ($1.0 \leq x < 2.0$), then floor (x)=1. Time t is reset by the index signal which is acquired at each setup period, and therefore has the value $0 \leq t < TL$.

So as FIG. 15 shows, the memory cell at each time T is sequentially selected according to the current time t. In other words, only a value $c\hat{}iu$, stored in the memory cell selected by formula (6), is updated by the following learning rule in following [2]. The other values included in the memory cell are not updated.

[2] Updating Target Memory Cell (Learning)

The value $c\hat{}iu$ stored in the memory cell number iu selected by formula (6) is updated using formula (7).

$$c\hat{}iu(N) = c\hat{}iu(L) + Kl \; o \; Ts \; o \; IFB \tag{7}$$

Here $c\hat{}iu$ (L) is the value before the update, $c\hat{}iu$ (N) is the value after the update, and the value $c\hat{}iu$ (N) after the update is written in the memory cell with the memory cell number iu. Kl is the learning gain and Ts is the sampling period.

[3] Selecting and Outputting Memory Cell Number to Be the Output Target

The memory cell number io of the output target cell is determined using formula (6), and the value of the memory cell of the memory cell number io is output.

The ID pit noise of the adjacent zone learned in this manner has the waveform shown in FIG. 10, for example. In order to help understand the relationship between the ID pit noise and the learning result, FIG. 10 shows a learned waveform of the ID pit noise in a system which observes the observed positional error signal where the learning control block 5-2 is in the previous stage of the feedback controller 5-1, which is an embodiment in FIG. 20.

[Other Embodiments of Learning Period Setup Process]

Figure 16:
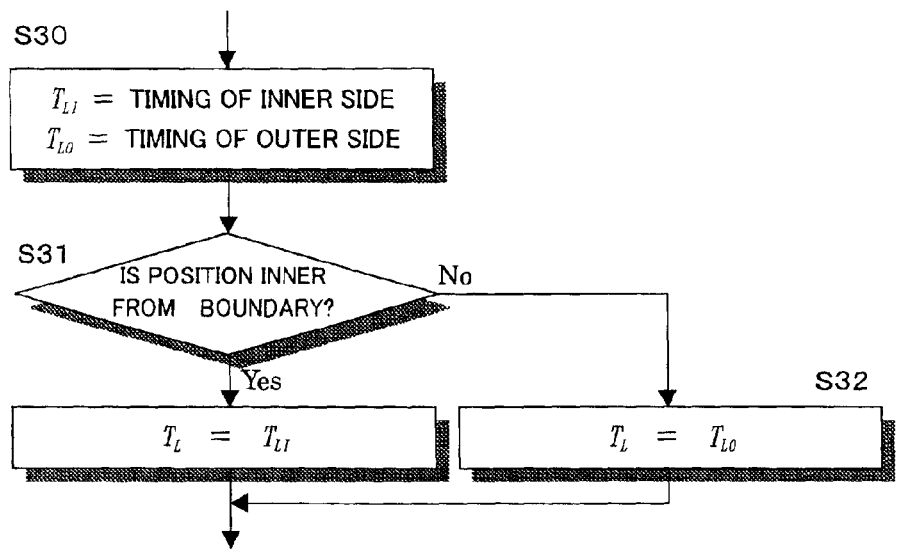
FIG. 16 is a flow chart depicting the learning timing calculation processing of another embodiment of the learning control block in FIG. 8.
Figure 17:
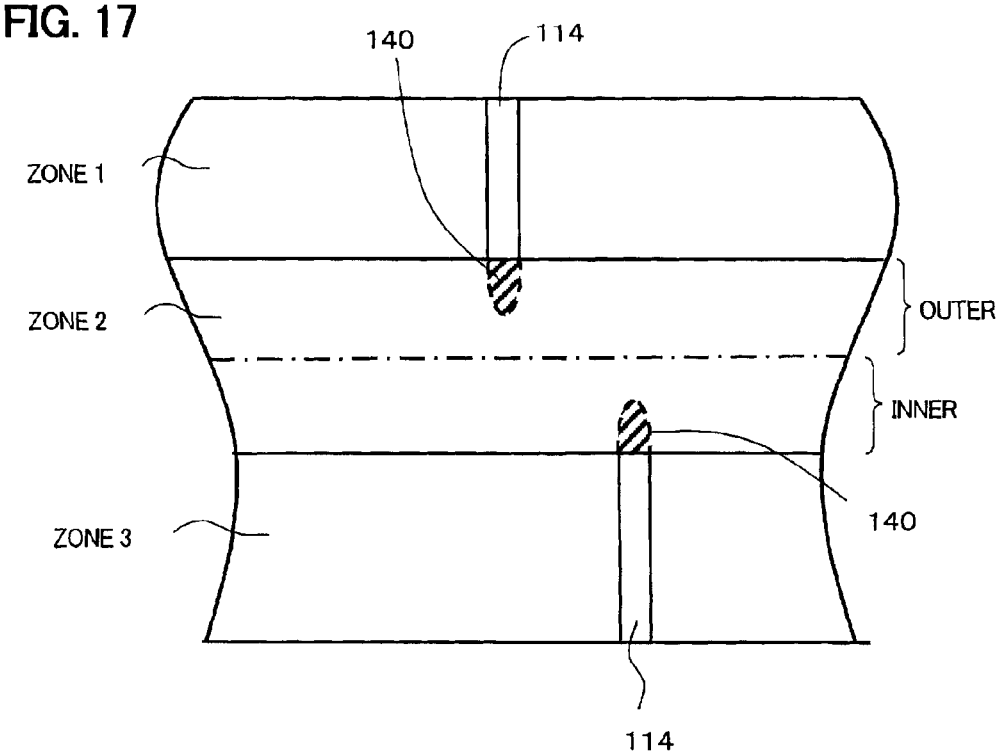
FIG. 17 is a diagram depicting the learning timing control in FIG. 16.

FIG. 16 is a flow chart depicting the learning period setup processing of another embodiment of the present invention, and FIG. 17 is a diagram depicting the operation thereof.

As FIG. 17 shows, when a plurality of zones (zones 1 and 3) adjacent to the zone where the optical beam is following up the track (zone 2) exists, the adjacent zones between the outer circumference side and the inner circumference side of zone 2 are different, so the synchronous timing of the learning is changed, with the center of the zone area as the boundary. In other words, the synchronization timing is calculated based on the number of sectors in zone 3, which is adjacent to the inside when the optical beam is following up a part inside from the center of the zone area, and the synchronization timing is calculated based on the number of sectors in zone 1, which is adjacent to the outside when the optical beam is following up a part outside from the center of the zone area.

In FIG. 16, the synchronization timing TL1 at the inner circumference side and the synchronization timing TL0 at the outer circumference side are calculated according to the processing in FIG. 12 or FIG. 13 (S30). Then it is judged whether the track position of the optical beam currently following up is on the inner circumference side from the boundary at the center of the zone, and if on the inner circumference side, the inner circumference side synchronization timing TL1 is set as the synchronization timing TL (S31). If not the inner circumference side, the outer circumference side synchronization timing TL0 is set as the synchronization timing TL (S32).

Figure 18:
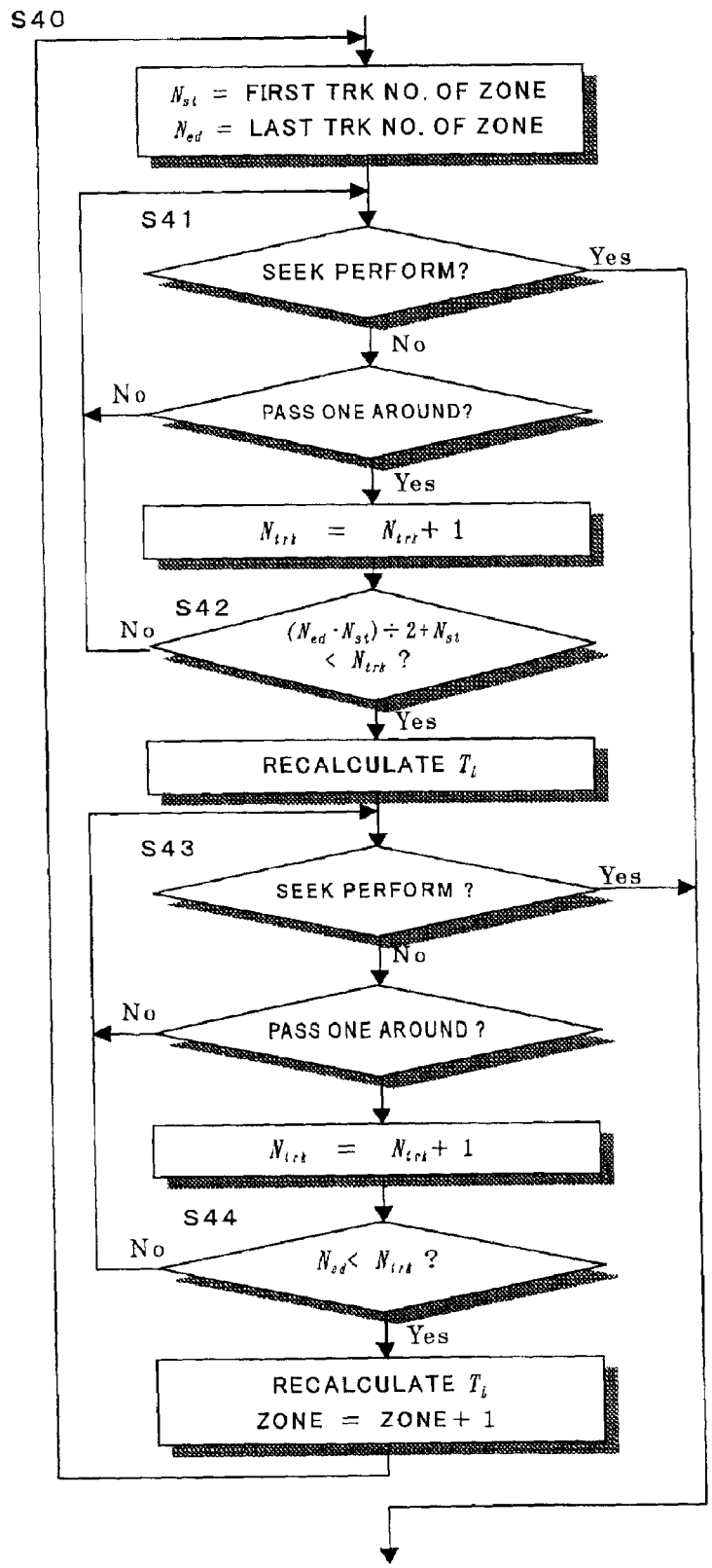
FIG. 18 is a flow chart depicting the learning timing control processing of another embodiment of the learning control block in FIG. 8.
Figure 19:
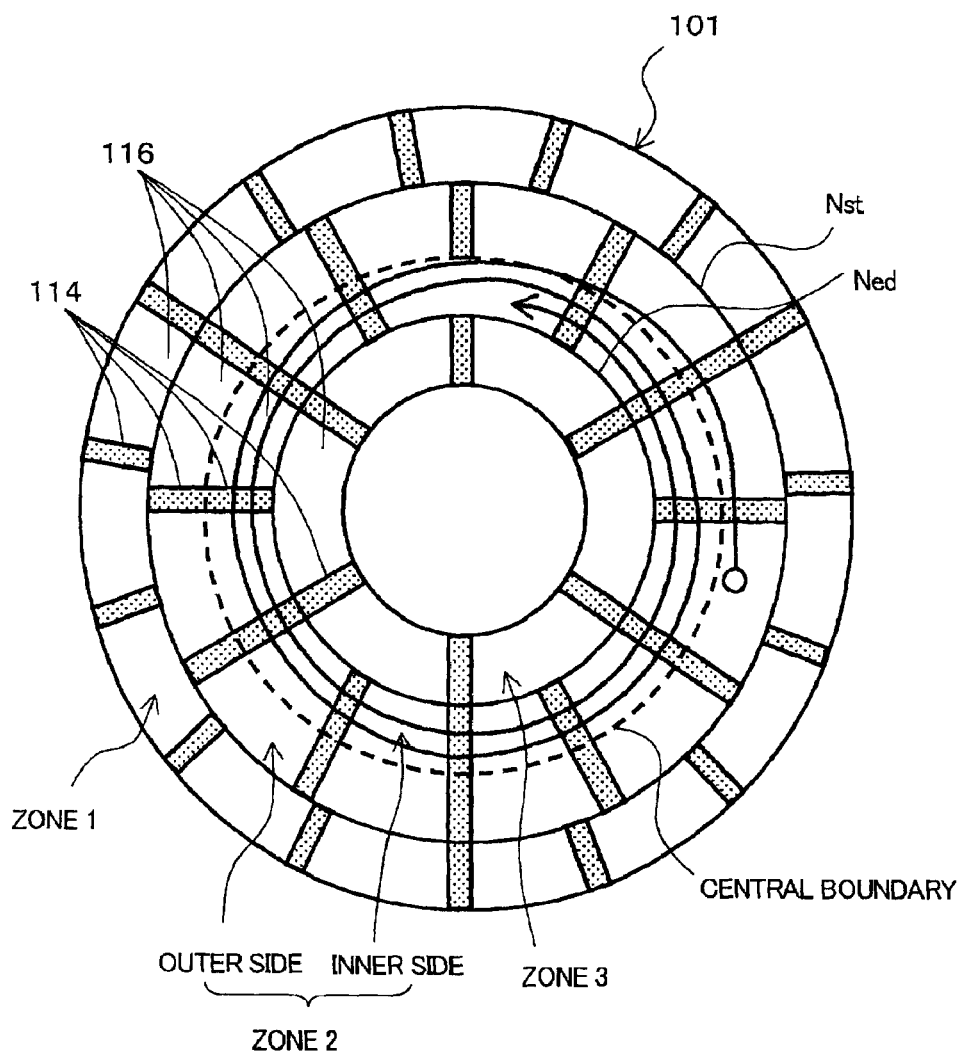
FIG. 19 is a diagram depicting the learning timing control in FIG. 18.

FIG. 18 is a flow chart depicting the learning period setup processing of another embodiment of the present invention, and FIG. 19 is a diagram depicting the operation thereof.

When the optical beam is moving from another location by seeking, the timing of synchronization according to the location can be acquired as shown in FIG. 17 and FIG. 18, since the location of the moving destination (zone, track) can be known in advance.

As the arrow mark in FIG. 19 shows, if data is continuously read, written or erased from the outer circumference to the inner circumference (or from the inner circumference to the outer circumference) in the same zone 2, a seek operation is not entered, therefore it has not been judged whether the optical beam passed the boundary at the center of the zone or at the boundary of the zone, so a synchronization timing matching the adjacent zone cannot be set.

To solve this problem, the zone position at the track follow-up start after seek (first and last track number of zone Nst, Ned) is set at the point when the seek operation ends, as shown in FIG. 18 (S40). And if seek is not executed, the current track number Ntrk is counted up each time the disk medium rotates (S41). And ((Ned−Nst)/2+Nst) is calculated to determine the center track number of the zone, and if the current track number Ntrk is greater than the center track number, it is judged that the optical beam passed the center of the zone, and the setup period TL is recalculated as shown in FIG. 16 (S42). By this, it is detected that the optical beam passed the zone center, and the synchronization timing TL of learning is changed.

In the same way, when seek is not executed, the current track number Ntrk is counted up each time the disk medium rotates (S43). And if the current track number Ntrk is greater than the last track number Ned of the zone, it is judged that the optical beam passed the boundary of the zone, the setup period TL is recalculated as shown in FIG. 12 and FIG. 16, and the zone is updated to (zone+1) (S44). By this, it is detected that the optical beam passed the zone boundary, and the synchronization timing TL of the learning is changed.

In this description, the first track address is the outer circumference side of the optical disk medium 101. In this way, when the optical beam follows up the track in a spiral without seeking in a same zone, it is detected whether the optical beam passed the center of the zone area or the zone boundary, so the synchronization timing of the learning can be changed.

[Other Embodiments of Feedback Control System]

Figure 20:
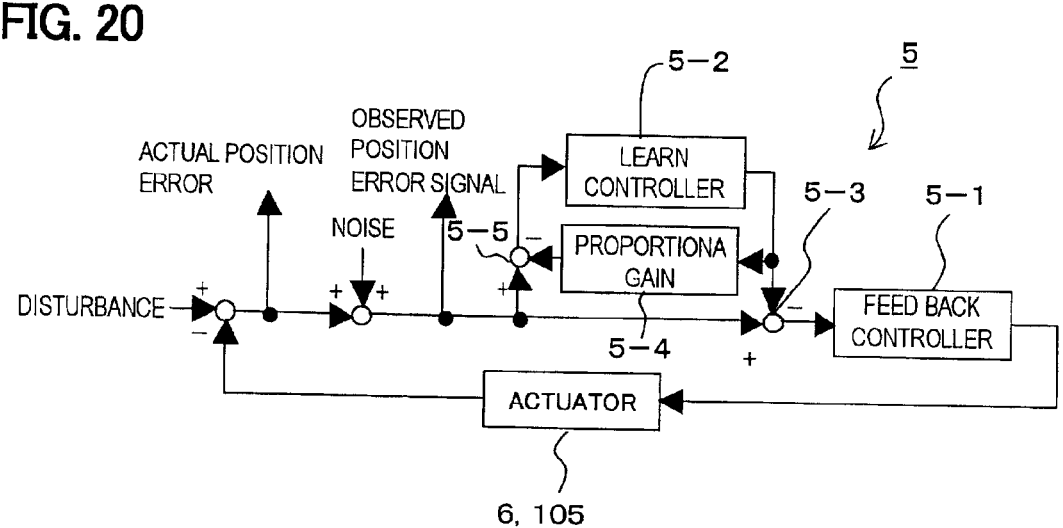
FIG. 20 is a block diagram of another embodiment of the track servo control system in FIG. 1.

FIG. 20 is a block diagram of the feedback control system of another embodiment of the present invention. FIG. 20 shows a feedback control system of the track servo control mechanism of the digital controller 5 in FIG. 1, and in this embodiment, the learning control block 5-2 is at the input side of the feedback control block 5-1.

The feedback control system of the track servo mechanism is comprised of the feedback control block 5-1, learning control block 5-2, adders 5-3 and 5-5, and the proportional gain multiplication block 5-4, and the learning control block 5-2, adders 5-3 and 5-5, and the proportional gain multiplication block 5-4 are disposed at the input side of the feedback control block 5-1.

The observed positional error signal (tracking error signal TES) is a signal waveform that is added the periodic noise generated by the ID parts to the actual positional error subtracted the dislocation of the actuator from the disturbance due to the eccentricity of the medium 101 or for another reason, at track follow-up.

In the learning control block 5-2, the observed positional error signal is input, and the learning control signal which is an approximate function of an unknown drive current function is acquired by a learning rule. In the present invention, the learning control block 5-2 is operated at the period of the noise, the signal waveform synchronizing with the period of the noise is learned, and the waveform of the noise is identified. And the adder 5-3 subtracts the learning result from the observed position error signal, and removes the signal from the control loop. The operation of the proportional gain multiplier 5-4 and the adder 5-5 are the same as in the above mentioned embodiment in FIG. 8 and FIG. 9.

The feedback control block 5-1 receives the observed positional error signal after the noise is removed as the tracking error signal TES, and calculates the feedback command value IFB for moving the carriage (actuator) 105 by the carriage drive block 6, so as to eliminate the dislocation of the optical beam from the track center.

In this embodiment as well, the applied periodic noise can be removed from the control loop, and the vibration of the actuator due to the periodic noise can be prevented, therefore a stable track follow-up operation becomes possible. In other words, when periodic noise is applied to the positional control system, the system identify the waveform of the noise by learning the signal waveform synchronizing with the period of the noise, and remove the identified noise from the control loop to decrease influence of the noise.

Also by applying the present embodiment to the positional error signal, which is input to the feedback controller 5-1, an increase of positional errors due to noise can be controlled, and a relatively accurate positional error signal, where noises are removed to a certain extent, can be acquired.

The optical disk has a de-track detection function to stop writing/reading when the positional error signal exceeds a predetermined value to prevent a write to/read from the track adjacent to the target track. However, if there is major noise in the position error signal, the actual error and the magnitude of the signal to be observed is different, so reading/writing may have to be stopped even when unnecessary, or reading/writing may not be stopped when it must be.

In this embodiment, whether writing/reading is stopped can be accurately judged by acquiring a relatively accurate positional error signal where noise has been removed.

Figure 21:
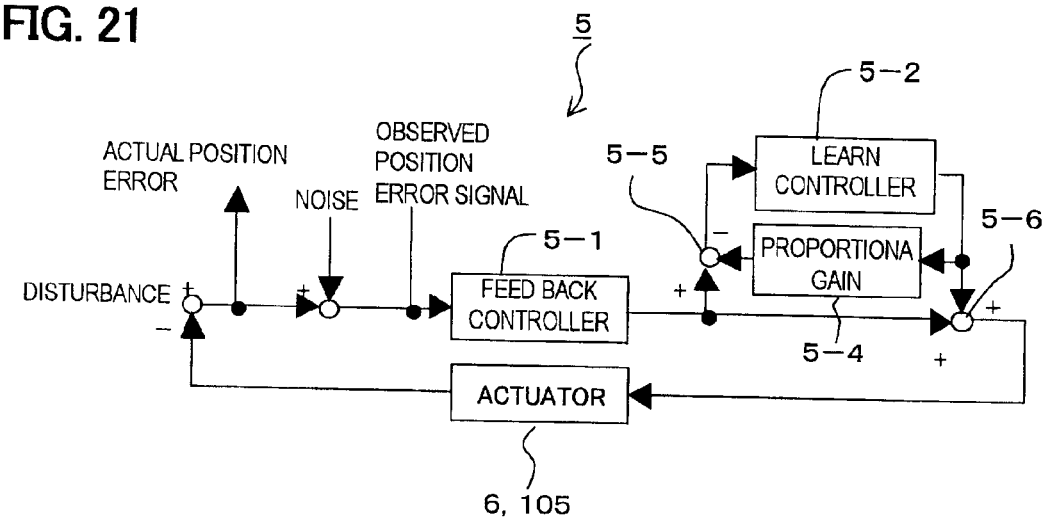
FIG. 21 is a block diagram of another embodiment of the track servo system in FIG. 1.
Figure 22:
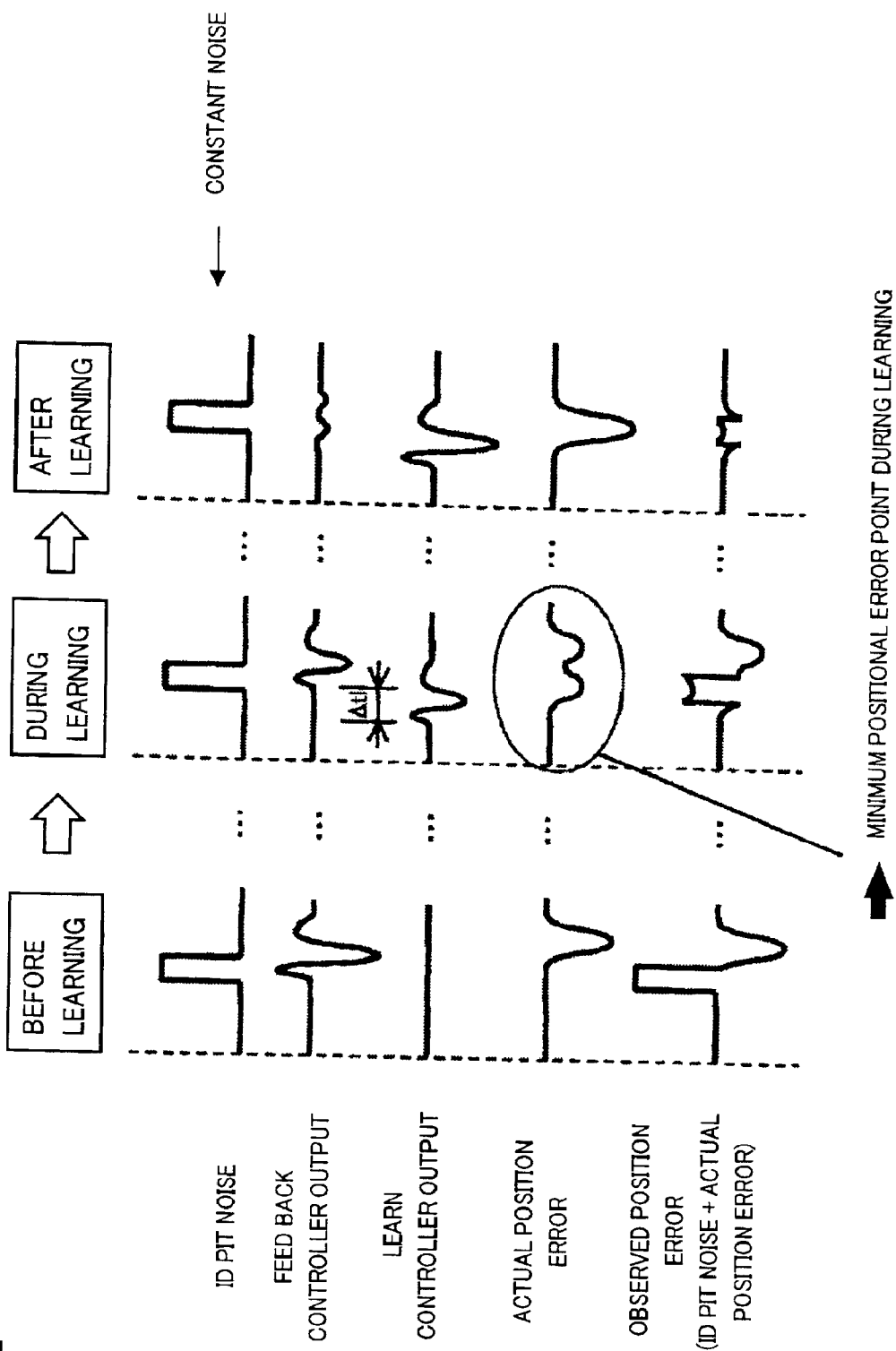
FIG. 22 is a diagram depicting the ID noise control operation of the configuration in FIG. 21.
Figure 23:
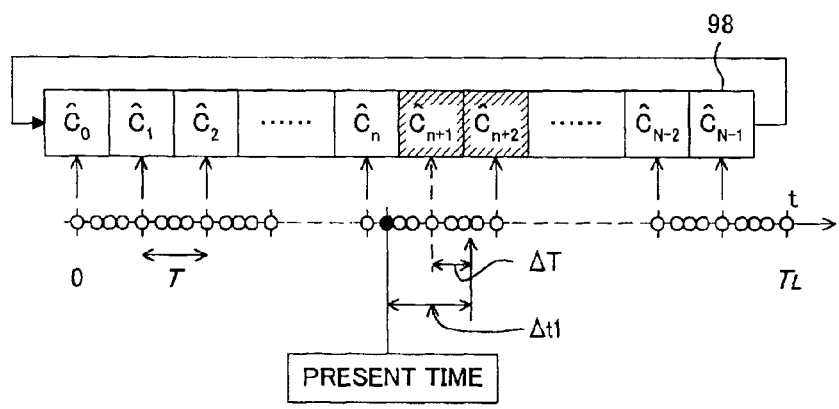
FIG. 23 is a diagram depicting the learning result output operation of the learning control block in FIG. 21.

FIG. 21 is a block diagram depicting the feedback control block of another embodiment of the present invention, FIG. 22 is a diagram depicting the operation thereof, and FIG. 23 is a diagram depicting the learning result output operation of the learning control block in FIG. 21.

In the case of the embodiments in FIG. 8 and FIG. 20, to prevent the vibration of the actuator, the system completely learn the periodic noise signal component, and remove the periodic noise signal component from the control loop. In this embodiment, the periodic pulse noise is cancelled, to some extent, by the operation of the actuator, so as to decrease the vibration of the actuator caused by the ID pit noise.

In other words, when the ID pit noise is learned by the learning method, which is the same as disclosed in the above mentioned Japanese Patent Laid-Open No. 2000-332792, and when feed-forward control is executed, the learning progresses from the start of learning, as FIG. 22 shows, the actuator operates so as to cancel the ID pit noise when the learning is completed, and the positional error signal to be input to the feedback controller 5-1 is decreased.

FIG. 22 shows the ID pit noise, output of the feedback controller 5-1, output of the learning control block 5-2, actual positional error and observed positional error signal before learning, during learning and at the completion of learning. In the case of the learning control to be applied the above mentioned patent, the noise of a predetermined period is learned, and the learning result is output at a time which is advanced by $\Delta t1$ than the actual time. By this, the optical beam moves so as to cancel the noise according to the result of learning, so the actual positional error increases and the observed positional error decreases. However the ID pit noise is not the actual positional error, but is an apparent error, so when learning is completed in this way, the actual positional error increases although the observed error decreases.

As FIG. 22 shows, there is a point where the positional error becomes the minimum during the above mentioned learning. Therefore, by converging the learning control in the middle of this learning, the positional error for the noise can be minimized. In this embodiment, the learning result is converged before the end of learning completes by subtracting the learning result from the input to the learning control block 5-2, just like the embodiment in FIG. 8, and the learning result is feed-forward output. By canceling about half of the ID pit noise by the operation of the actuator, the vibration of the actuator after the ID pit noise is controlled and the peak value of the actual positional error is decreased.

This control will now be described with reference to FIG. 21. FIG. 21 shows the feedback control system of the track servo control mechanism of the digital controller 5 in FIG. 1, and in this embodiment, the learning control block is disposed between the feedback control block and the carriage drive block of the actuator (carriage).

In FIG. 21, the feedback control system of the track servo mechanism is comprised of the feedback control block 5-1, learning control block 5-2, adders 5-5 and 5-6, and the proportional gain multiplication block 5-4.

The observed positional error signal (tracking error signal TES) which is input to the feedback control block 5-1 has a signal waveform added the periodic noise generated by the ID parts to the actual positional error subtracted the dislocation of the actuator from the disturbance due to the eccentricity of the medium 101, or another reason, at track follow-up.

The feedback control block 5-1 receives the tracking error signal TES, and calculates the feedback command value IFB for moving the carriage (actuator) 105 by the carriage drive block 6, so as to make the tracking error signal TES zero, namely to eliminate the dislocation of the optical beam from the track center.

The feedback control block 5-1 calculates the control signal IFB by a known operation based on an equation of state or PID operation, for example, and this control signal IFB becomes the feedback current command value set to the carriage drive block 6.

The learning control block 5-2 is input the control signal IFB, which is the feedback current command value output from the feedback control block 5-1, and acquires the learning control signal, which is an approximate function of an unknown drive current function according to a learning rule. In the present invention, the learning control block 5-2 is operated at the period of the noise, the learning control block learns the signal waveform synchronizing with the period of the noise, and identifies the waveform of the noise. And the adder 5-6 adds the learning result to the feedback command value IFB, and executes feed-forward control.

This ID pit noise is not the actual positional error but an apparent error, so by this operation, the error to be observed decreases however the actual error increases.

In this embodiment, just like the embodiment in FIG. 8, the learning result of the learning control block 5-2 is multiplied by the proportional gain using the proportional gain multiplication block 5-4, is fed back as input to the learning control block 5-2, and is subtracted from the input IFB using the adder 5-5. By this, the learning result is converged before the learning completely ends, and the learning result is feed-forward output.

In other words, the proportional gain multiplication block 5-4 and the adder 5-5 are added so as to form a loop where the output of the learning control block 5-2 (learning result) is multiplied by the gain Kc using the proportional gain multiplication block 5-4, and the multiplication result is subtracted from the input IFB (t) using the adder 5-5, and input to the learning control block 5-2 is acquired.

As a result, the periodic component included in the input signal of the learning control block 5-2 decreases as the learning of the learning control block 5-2 progresses. If the gain Kc is "1", for example, the periodic component is removed from the input signal to the learning control block 5-2, and learning converges when the amplitude ratio between the learning result I1 and the periodic component included in the input signal IFB becomes 1:1.

In this way, the result is converged before learning completely ends, and the result is feed-forward output by subtracting the learning result from the input to the learning control block 5-2 and then learning, as shown in FIG. 22, so the vibration of the actuator after the ID pit noise is generated can be controlled, and the peak value of the positional error can be decreased to about half by canceling the ID pit noise using the operation of the actuator.

With this method as well, the periodic noise can be removed without changing the closed loop characteristic and sensitivity characteristic of the control system, so the deterioration of the follow-up performance can be prevented. Also even if the waveform of the periodic noise is an unknown function, a waveform synchronizing with the period of the noise can be learned only if the period is known, and the vibration of the actuator due to noise can be decreased.

In this case, the FF output block 91 of the learning control block 5-2 considers the time delay, such as the phase delay of the control target when the learning result at that point stored in the ring buffer memory 98 is output to the feedback control system, and the learning result which is advanced in time is feed-forward output.

A phase shift filter is not needed to feed-forward output the learning result, which is advanced in time. Since the learning control block 5-2 manages the current pattern of the periodic noise corresponding to the time t, a memory cell is selected according to the time advanced considering the phase delay of the control target, and the learning result at that time is output.

By compensating for this advancement for the feed-forward output of the learning result in this way, the response waveform can be prevented from vibrating as in the case when no advancement is compensated, and a stable learning result can be obtained.

The operation of the FF output block 91, which outputs the learning result at an advanced time, will now be described with reference to FIG. 23. As described above, when the learning result is output, advanced time compensation Δt1 is added to assure stability in the conversion of learning, and the memory cell number io of the output target cell is decided, as shown in formula (8).

$$io = \text{floor}((t + \Delta t1)/T) \quad (8)$$

Then for linear interpolation, the memory cell adjacent to this memory cell is also selected. Since Δt1 has been added, io in formula (8) may be N−1 or more. In this case, the applicable memory cell is selected, returning to the beginning of the ring buffer 98.

Therefore 2 memory cell numbers, io1 and io2, to be selected, are given by the following formula (9).

If $io \leq N-2$ then $io1=io$, $io2=io+1$

If $io=N-1$ then $io1=N-1$, $io2=0$

If $io \geq N$ then $io1=io-N$, $io2=io1+1$ $\quad (9)$

By linear interpolation, step-wise output can be avoided, which is especially effective when the memory length is short. By performing linear interpolation on 2 continuous memory cells in the output of the learning result, problems arising from discontinuous output due to the stepwise output, as seen in the case of the conventional method, can be avoided.

FIG. 23 is a diagram depicting the selection of the output target cell at the same control sampling time as in FIG. 15. In FIG. 23, the advanced time compensation Δt1 is added, so the next cell c^n+1 is selected. If Δt1<T is used for designing (e.g. if the number of division N is decreased, T increases in inverse proportion to this), the cell to be the learning target and the cell to be the output target may become the same depending on the timing of the control sample.

EXAMPLE

Figure 24:
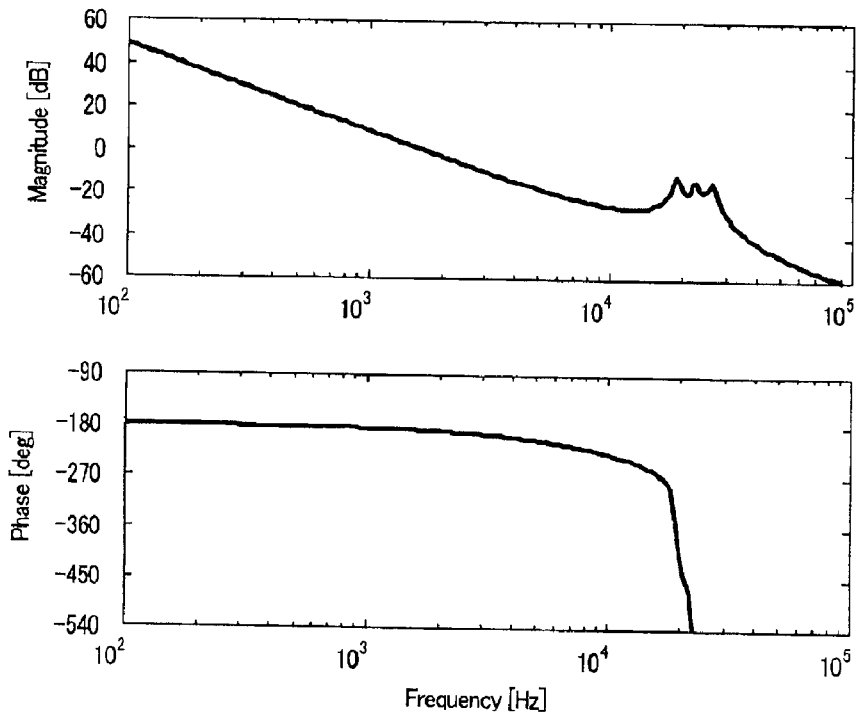
FIG. 24 is a frequency characteristic diagram of 1 stage tracking mechanism of an example of the present invention.
Figure 25:
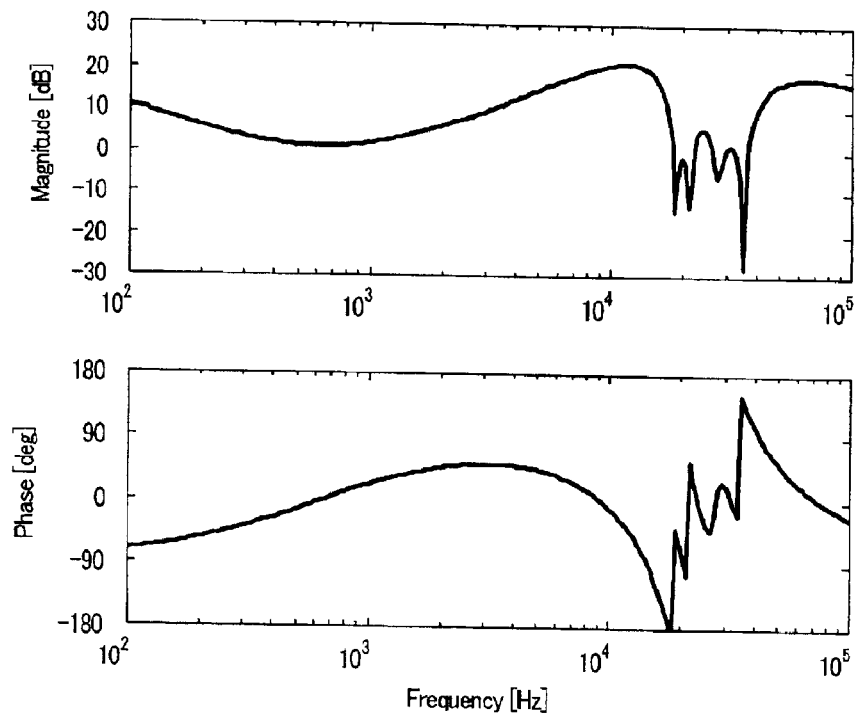
FIG. 25 is a frequency characteristic diagram of a feedback controller of an example of the present invention.

As an example of the present invention, simulation was performed by applying a pulse noise, such as an ID pit noise, to the tracking control system of a magneto-optical disk, which is comprised of a 1 stage tracking mechanism 105 (see FIG. 1) having frequency response characteristics (gain against frequency and phase characteristics) shown in FIG. 24, and a feedback controller 5-1 having the frequency response characteristics (gain against frequency and phase characteristics) shown in FIG. 25.

In this example, the period of the pulse noise is 1.5 kHz, the period of the learning is also 1.5 kHz, the number of division N of the learning is "47", and the sampling frequency of the controller 5-1 is 70 kHz. For the simulation of this example we used MATLAB/SIMULINK software published by MathWorks.

Example 1

In the configuration shown in FIG. 8, the gain Kc, by which the learning result subtracted from the input to the learning control block 5-2 is multiplied, is "1.8". By changing Kc, the attenuation result of the noise can be adjusted.

Figure 26:
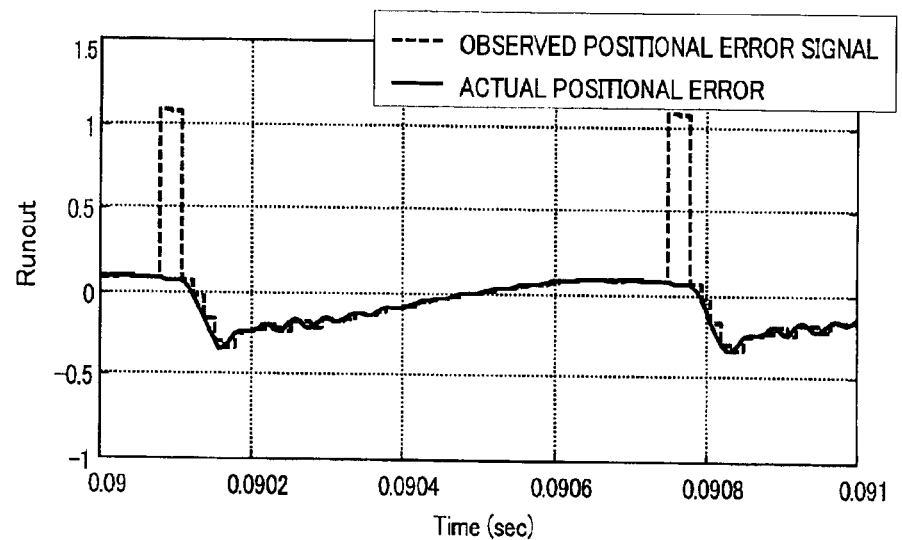
FIG. 26 is a diagram depicting the simulation result of the positional error of the track servo mechanism of an embodiment of the present invention in FIG. 8.
Figure 27:
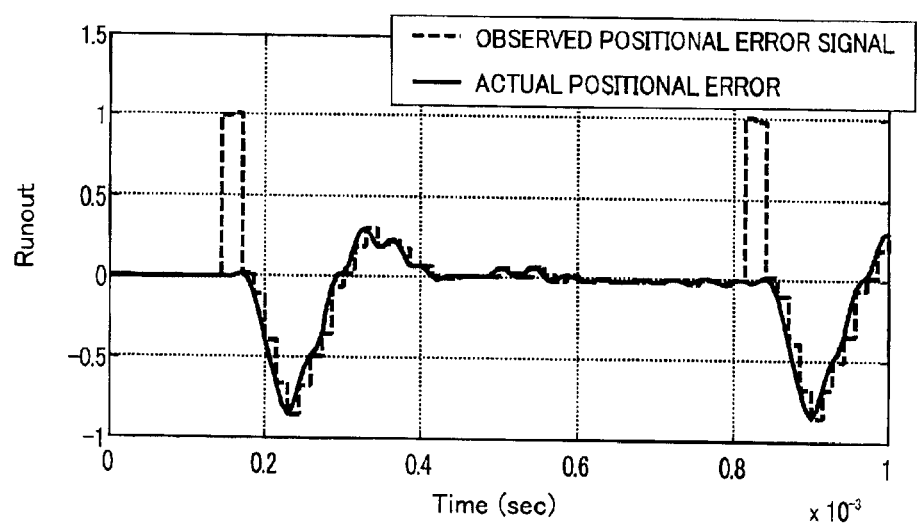
FIG. 27 is a diagram depicting the simulation result of the positional error of a comparison example with respect to the present invention.

FIG. 26 shows the simulation result (positional error against time=run-out amount) of Example 1. For comparison, FIG. 27 shows the simulation result when no compensations were taken for the ID pit noise. The broken line in FIG. 26 and FIG. 27 show the observed positional error signals, and the sold line shows the actual positional error.

In the observed positional error signals, pulse noise, which does not exist in the actual positional error, appears at the 1.5 kHz period, and after that both the actual positional error and the observed positional error signals increase. Since a disturbance was not applied in this simulation to clarify the influence of noise, the cause of the positional error is completely due to vibration by noise. Comparing FIG. 26 and FIG. 27, it is clear that the actual positional error is decreased to about half by the noise identification effect of the learning of the present invention.

Figure 28:
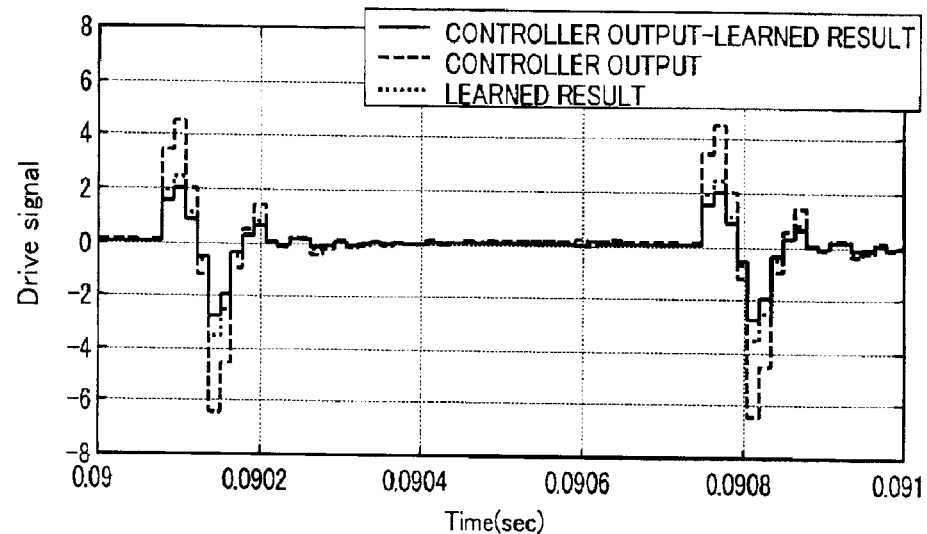
FIG. 28 is a diagram depicting the simulation result of the drive signal of the track servo mechanism of an embodiment of the present invention in FIG. 8.

FIG. 28 shows the simulation result of the actuator drive signal of Example 1. The sold line in FIG. 28 is the signal when the learning result is subtracted from the controller output, the broken line is the controller output, and the dotted line is the learning result. By subtracting the learning result from the controller output, the final drive signal (solid line) becomes smaller, and the vibration of the actuator due to noise is decreased.

Example 2

Figure 29:
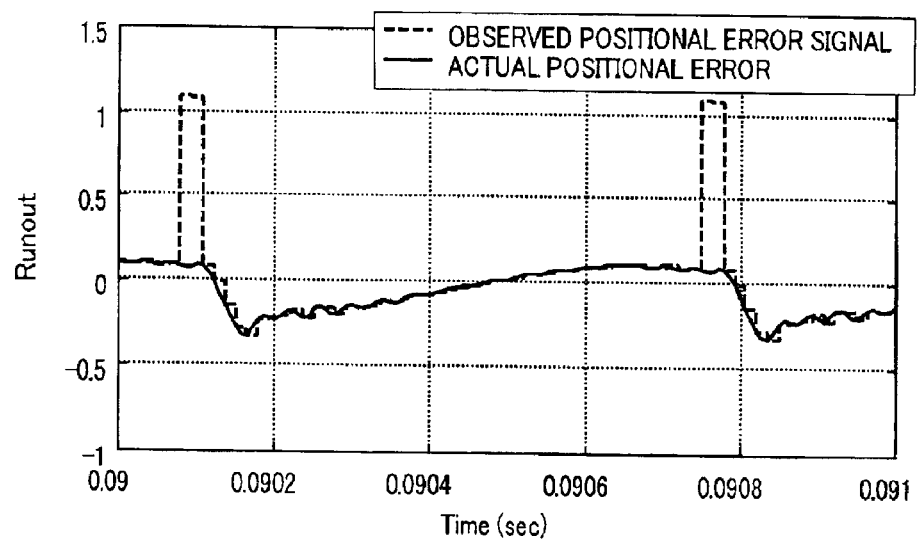
FIG. 29 is a diagram depicting the simulation result of the positional error of the track servo mechanism of another embodiment of the present invention in FIG. 20.

In the feedback control system in FIG. 20, simulation was performed with the same parameters as Example 1. FIG. 29 is the simulation result (positional error against time=runout amount) of Example 2. The broken line in FIG. 29 is the observed positional error signal, and the solid line is the actual positional error.

In the observed positional error signal, the pulse noise, which does not exist in the actual positional error, appears at the 1.5 kHz period, and after that, both the actual positional error and the observed positional error signals increase. Since a disturbance was not applied in this simulation to clarify the influence of noise, the cause of the positional error is completely due to vibration by noise. In FIG. 29 as well, the actual positional error is decreased to about half by the noise identification effect of the learning of the present invention, just as in the case of Example 1.

Figure 30:
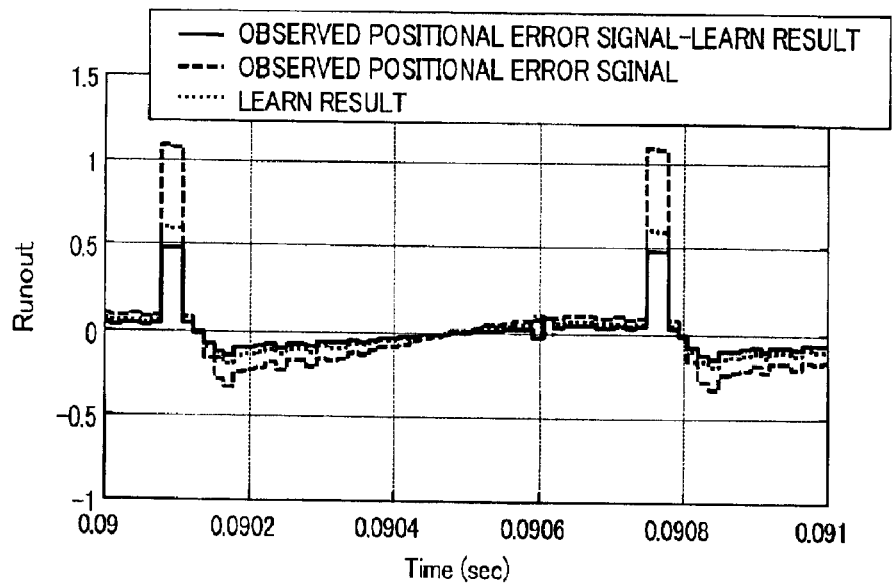
FIG. 30 is a diagram depicting the simulation result of the positional error of the track servo mechanism and the learning result of another embodiment of the present invention in FIG. 20.

FIG. 30 shows the simulation result of the positional error signal and learning result of Example 2. The solid line in FIG. 30 is the signal when the learning result is subtracted from the observed positional error, the broken line is the observed positional error, and the dotted line is the learning result. As FIG. 30 shows, noise is controlled to be half or less by subtracting the learning result from the observed positional error signal. By using this signal, a more accurate de-track detection becomes possible.

Example 3

With the configuration shown in FIG. 21, simulation was performed with the same parameters as Example 1. The differences from Example 1 are that the learning result was not subtracted, but was added to the control system, the learning result is output at a predetermined time before the output time, and the gain Kc, by which the result when the learning result is subtracted from the input to the learning control block is multiplied, is "1.1", which is smaller than Example 1.

Figure 31:
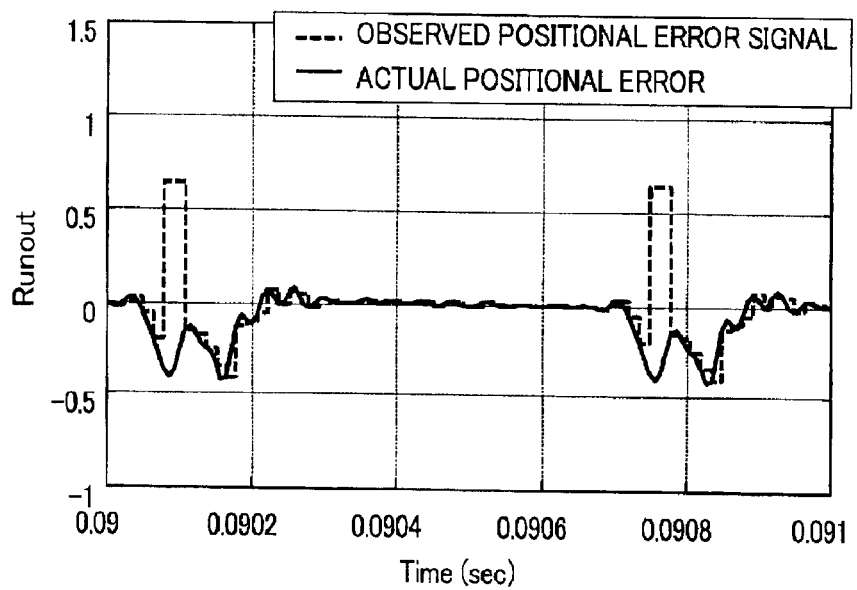
FIG. 31 is a diagram depicting the simulation result of the positional error of the track servo mechanism of another embodiment of the present invention in FIG. 21.
Figure 32:
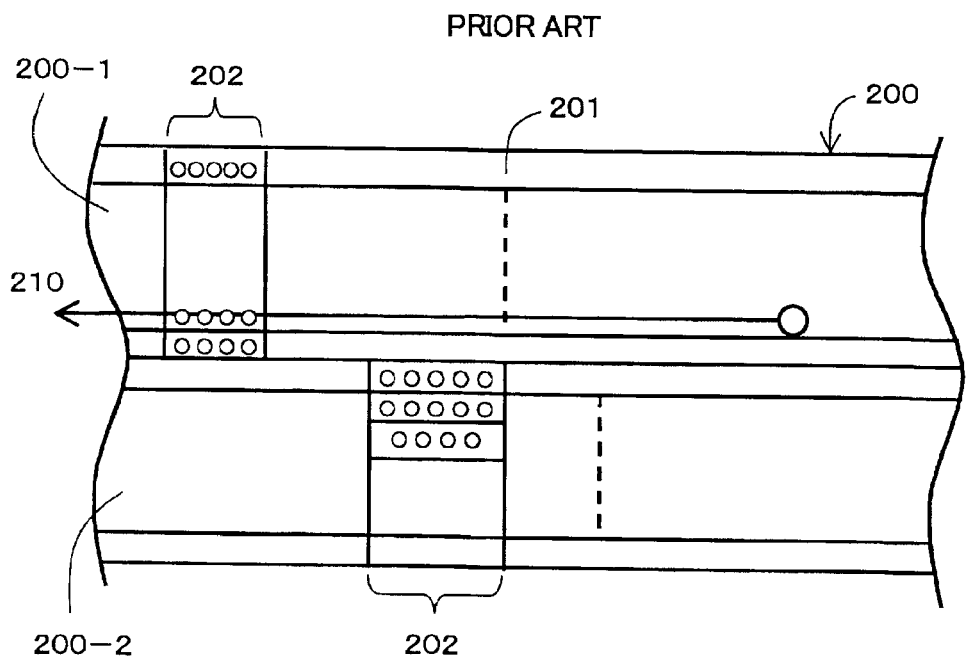
FIG. 32 is a diagram depicting a prior art.

FIG. 31 shows the simulation result of Example 3. As FIG. 31 shows, there are 2 areas where the actual positional error (solid line) increases during 1 period of noise. By adding the learning result to the loop, the first error increase occurs, and the noise included in the positional error signal (broken line) is controlled by about 40%. As a result, the vibration of the actuator after noise is also controlled, and the peak value of the actual positional error decreases.

The present invention has been described using the embodiments, but various modifications are possible within the scope of the spirit of the present invention, and these shall not be excluded from the technical scope of the present invention.

In the present invention, as the ID noise is a periodic noise, system learn this noise and input the learning result to the feedback control system so as to control the vibration of the actuator by the ID noise. After learning, however, the ID noise is not removed from the feedback control system even if vibration is controlled, so learning may not be converged. Therefore in the present invention, the learning result is subtracted from the learning input, and the learning signal after subtraction is learned so as to converge the learning.

Therefore even if a periodic ID noise is applied, the noise can be removed from the control loop, the vibration of the actuator by the periodic noise can be decreased, and a stable track follow-up operation becomes possible. In other words, when periodic noise is applied to the positioning control system, the system identify the waveform of the noise by learning the signal waveform synchronizing with the period of the noise, and remove the signal from the control loop to decrease the influence of the noise.

What is claimed is:

1. A track servo control method for following an optical beam to a track of an optical storage medium that is formed of tracks comprised of a plurality of sectors having ID parts shaped as a relief structure, comprising:
    a step of observing a positional error of the optical beam from said track by a reflected light from said optical storage medium;
    a step of controlling an actuator for moving said optical beam by a feedback control system according to said observed positional error;
    a step of inputting a signal based on said observed positional error and learning a signal waveform synchronizing with the period of said ID parts; and
    a step of inputting a learning result to said feedback control system and controlling the vibration of said actuator by periodic noise synchronizing with the period of said ID parts,
    wherein said learning step comprises a step of subtracting the learning result from the learning input and learning the learning signal after subtraction.

2. The track servo control method according to claim 1, wherein said learning step comprises a step of learning a signal waveform synchronizing with the period of the ID parts of a zone adjacent to the zone of the track where said optical beam follows up out of a plurality of zones divided for each of said plurality of tracks of said optical storage medium.

3. The track servo control method according to claim 2, wherein said learning step comprises:
    a step of learning a signal waveform synchronizing with the period of the ID parts of the zone adjacent to the inside when the track of the zone where said optical beam follows up is inside from the center of the follow-up zone; and
    a step of learning a signal waveform synchronizing with the period of the ID parts of the zone adjacent to the outside when the track is outside from the center of the follow-up zone, out of the plurality of zones divided for each of said plurality of tracks of said optical storage medium.

4. The track servo control method according to claim 3, wherein said learning step further comprises a step of detecting whether said track to be followed up is inside or outside from the center of the follow-up zone by the follow-up start track position of said optical beam.

5. The track servo control method according to claim 3, wherein said learning step further comprises a step of detecting whether said track to be followed up is inside or outside from the center of the follow-up zone by the follow-up start track position of said optical beam and the rotation frequency of said optical storage medium from said follow-up start.

6. The track servo control method according to claim 1, wherein said control step comprises a step of subtracting said learning result from the signal of said feedback control system.

7. The track servo control method according to claim 6, wherein said learning step comprises a step of learning a signal waveform synchronizing with the period of said ID parts using the signal based on said observed positional error as an input for the command value of said feedback control system, and
    said control step comprises a step of subtracting said learning result from the command value of said feedback control system.

8. The track servo control method according to claim 6, wherein said learning step comprises a step of learning a signal waveform synchronizing with the period of said ID parts using the signal based on said observed positional error as an input for the input signal of said feedback control system, and said control step comprises a step of subtracting said learning result from the input signal of said feedback control system.

9. The track servo control method according to claim 6, wherein said learning step comprises a step of learning a signal waveform synchronizing with the period of said ID parts using the signal based on said observed positional error as an input for the command value of said feedback control system and outputting the learning result where phase has advanced, and said control step comprises a step of adding said learning result to the command value of said feedback control system.

10. A track servo controller for following an optical beam to a track of an optical storage medium that is formed of tracks comprised of a plurality of sectors having ID parts shaped to be a relief structure, comprising:

detection means for observing the positional error of said optical beam from said track by the reflected light from said optical storage medium;

a feedback control means for controlling an actuator for moving said optical beam by a feedback control system according to said observed positional error; and a learning control means for learning a signal waveform synchronizing with the period of said ID parts from a signal based on said observed positional error, and inputting a learning result to said feedback control system to control the vibration of said actuator by periodic noise synchronizing with the period of said ID parts, wherein said learning control means subtracts the learning result from the learning input and learns the learning signal after subtraction.

11. The track servo controller according to claim 10, wherein said learning control means learns a signal waveform synchronizing with the period of the ID parts of a zone adjacent to the zone of the track where said optical beam follows up out of a plurality of zones divided for each one of said plurality of tracks of said optical storage medium.

12. The track servo controller according to claim 11, wherein said learning control means learn a signal waveform synchronizing with the period of the ID parts of the zone adjacent to the inside when the track of the zone where said optical beam follows up is inside from the center of the follow-up zone and with the period of the ID parts of the zone adjacent to the outside when the track is outside from the center of the follow-up zone out of the plurality of zones divided for each of said plurality of tracks of said optical storage medium.

13. The track servo controller according to claim 12, wherein said learning control means detect whether said track to be followed up is inside or outside from the center of the follow-up zone by the follow-up start track position of said optical beam.

14. The track servo controller according to claim 13, wherein said learning control means detect whether said track to be followed up is inside or outside from the center of the follow-up zone by the follow-up start track position of said optical beam and the rotation frequency of said optical storage medium from said follow-up start.

15. The track servo controller according to claim 10, wherein said learning control means subtract said learning result from the signal of said feedback control system.

16. The track servo controller according to claim 15, wherein said learning control means learn a signal waveform synchronizing with the period of said ID parts using the signal based on said observed positional error as an input for the command value of said feedback control means, and subtracts said learning result from the command value of said feedback control means.

17. The track servo controller according to claim 15, wherein said learning control means learn a signal waveform synchronizing with the period of said ID parts using the signal based on said observed positional error as an input for the input signal of said feedback control means, and subtracts said learning result from the input signal of said feedback control means.

18. The track servo controller according to claim 15, wherein said learning control means learn a signal waveform synchronizing with the period of said ID parts using the signal based on said observed positional error as an input for the command value of said feedback control means, outputs the learning result where phase has advanced, and adds said learning result to the command value of said feedback control means.

19. An optical storage device for at least reading the information of a track of an optical storage medium that is formed of tracks comprised of a plurality of sectors having ID parts shaped to be a relief structure, comprising:

an optical head having an actuator for moving said optical beam; and a track servo controller for controlling said actuator so that the optical beam follows said track, wherein said track servo controller comprises:

detection means for observing the positional error of said optical beam from said track by the reflected light from said optical storage medium;

a feedback control means for controlling the actuator by a feedback control system; and a learning control means for learning a signal waveform synchronizing with the period of said ID parts from a signal based on said observed positional error, inputting a learning result to said feedback control system to control a vibration of said actuator by periodic noise synchronizing with the period of said ID parts, and wherein said learning control means subtracts the learning result from the learning input, and learns the learning signal after subtractions.

20. The optical storage device according to claim 19, wherein said learning control means learn a signal waveform synchronizing with the period of the ID parts of a zone adjacent to the zone of the track where said optical beam follows up out of a plurality of zones divided for each one of said plurality of tracks of said optical storage medium.

* * * * *